United States Patent
Berard et al.

(10) Patent No.: US 11,858,237 B2
(45) Date of Patent: Jan. 2, 2024

(54) EXTERNAL LUMINOUS SIGNALING VEHICLE GLAZING, VEHICLE INCORPORATING SAME AND MANUFACTURE

(71) Applicant: SAINT-GOBAIN GLASS FRANCE, Courbevoie (FR)

(72) Inventors: Mathieu Berard, Paris (FR); Olivier Delrieu, Epinay sur Orge (FR); Pascal Bauerle, Davenescourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 619 days.

(21) Appl. No.: 16/768,433

(22) PCT Filed: Nov. 28, 2018

(86) PCT No.: PCT/FR2018/053021
§ 371 (c)(1),
(2) Date: May 29, 2020

(87) PCT Pub. No.: WO2019/106290
PCT Pub. Date: Jun. 6, 2019

(65) Prior Publication Data
US 2020/0384740 A1    Dec. 10, 2020

(30) Foreign Application Priority Data
Nov. 30, 2017    (FR) ...................................... 1761477

(51) Int. Cl.
*B32B 17/10*    (2006.01)
*F21S 43/14*    (2018.01)
(Continued)

(52) U.S. Cl.
CPC ........ *B32B 17/10541* (2013.01); *B60Q 1/268* (2013.01); *F21S 43/14* (2018.01); *F21S 43/15* (2018.01); *F21S 43/26* (2018.01)

(58) Field of Classification Search
CPC .......................... B60Q 1/268; B32B 17/10541
See application file for complete search history.

(56) References Cited

U.S. PATENT DOCUMENTS

| | | |
|---|---|---|
| 2014/0098553 A1 | 4/2014 | Frey et al. |
| 2014/0098557 A1 | 4/2014 | Veerasamy et al. |
| 2015/0146286 A1 | 5/2015 | Hagen et al. |

FOREIGN PATENT DOCUMENTS

| | | |
|---|---|---|
| EP | 0 762 049 A1 | 3/1997 |
| EP | 0 844 075 A1 | 5/1998 |

(Continued)

OTHER PUBLICATIONS

International Search Report as issued in International Patent Application No. PCT/FR2018/053021, dated Mar. 6, 2019.

*Primary Examiner* — Mariceli Santiago
(74) *Attorney, Agent, or Firm* — Pillsbury Winthrop Shaw Pittman LLP

(57) ABSTRACT

An exterior light signaling vehicle glazing selected from a rear window, a side window or a windshield includes a first glazing which forms an outer glazing and has first and second main faces; diodes; and for each diode, a primary optical system or a collimating optical system between the diodes and the second main face, followed by a redirecting optical system.

26 Claims, 13 Drawing Sheets

(51) Int. Cl.
     *F21S 43/15*         (2018.01)
     *B60Q 1/26*         (2006.01)
     *F21S 43/20*         (2018.01)

(56) References Cited

FOREIGN PATENT DOCUMENTS

| | | |
|---|---|---|
| FR | 2 742 393 A1 | 6/1997 |
| WO | WO 2012/025685 A1 | 3/2012 |
| WO | WO 2013/175101 A1 | 11/2013 |
| WO | WO 2015/031594 A2 | 3/2015 |
| WO | WO 2015/066201 A1 | 5/2015 |
| WO | WO 2015/079159 A1 | 6/2015 |
| WO | WO 2016/079459 A1 | 5/2016 |
| WO | WO-2017042703 A1 * 3/2017 ....... B29C 45/14811 |

* cited by examiner

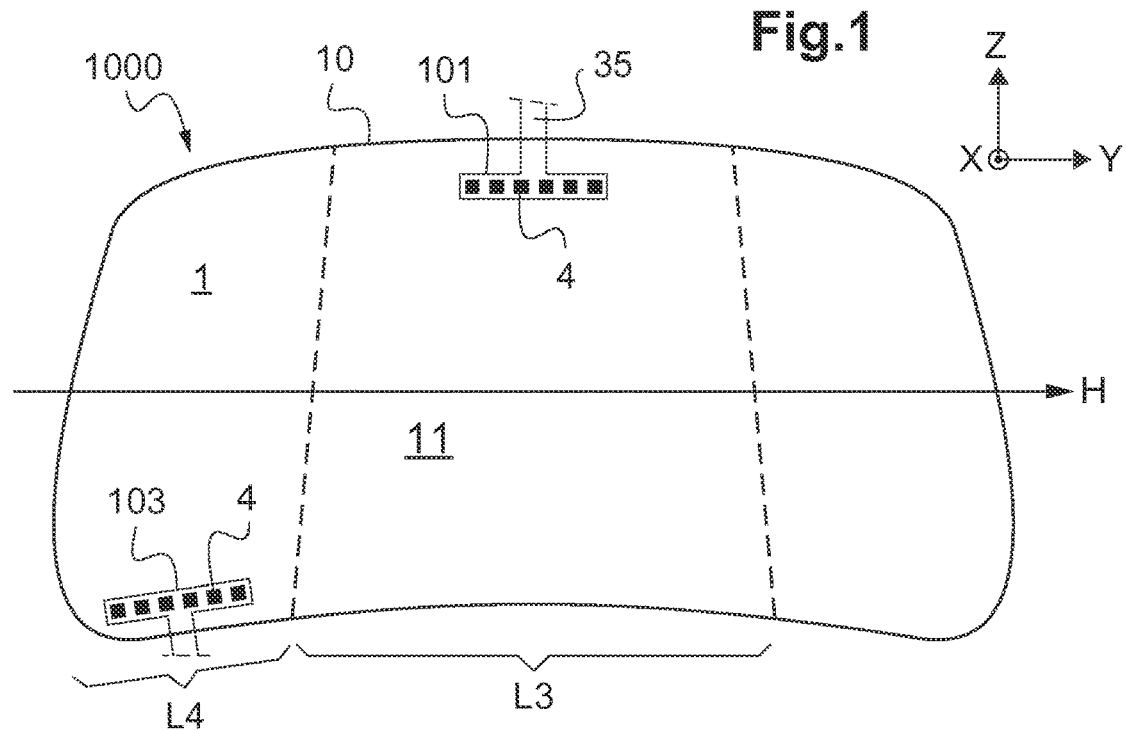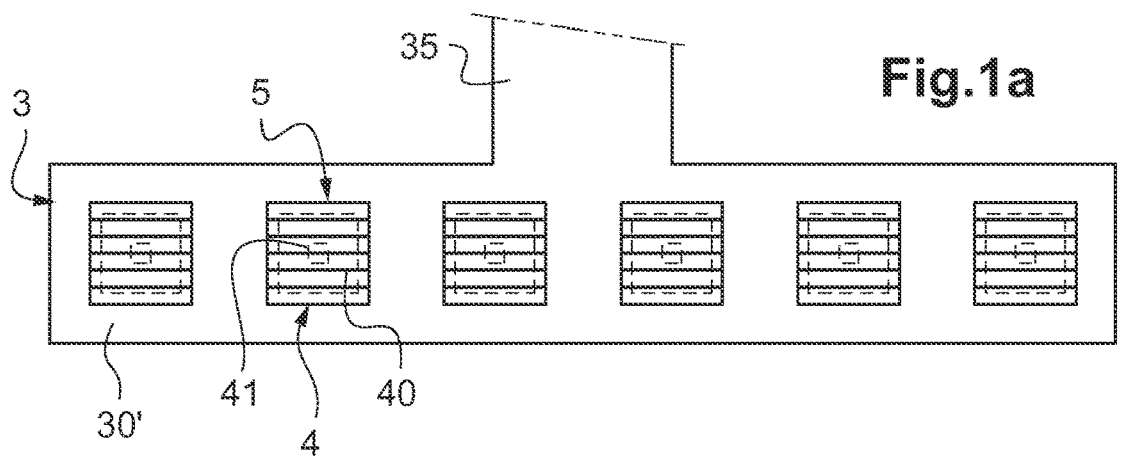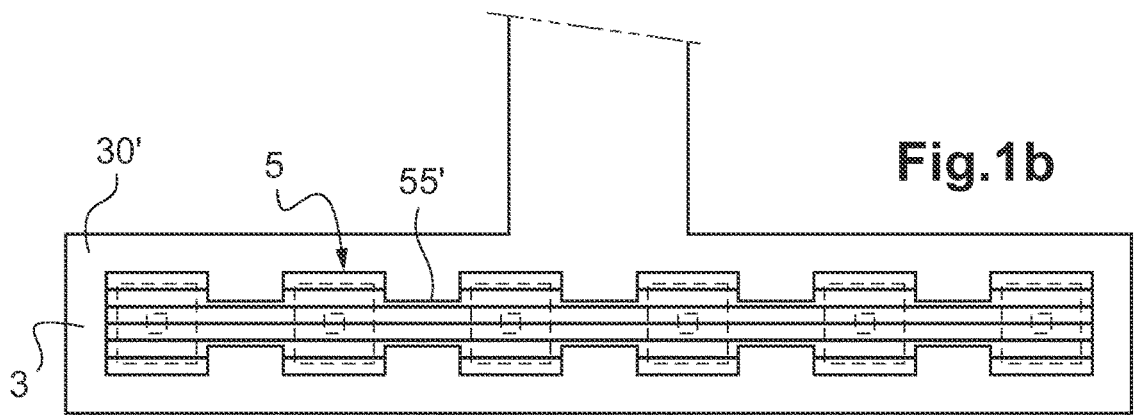

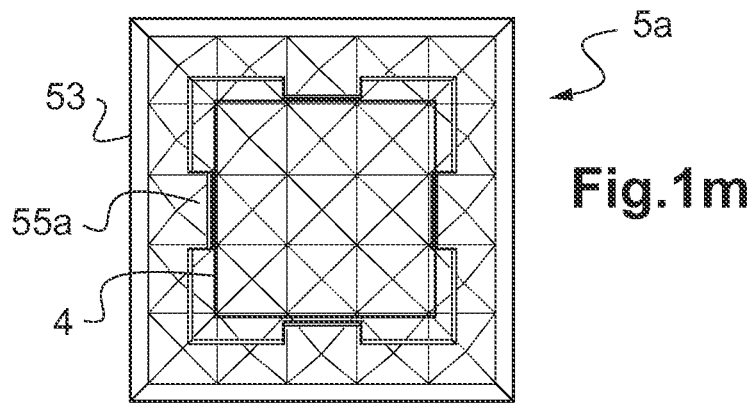
Fig.1m
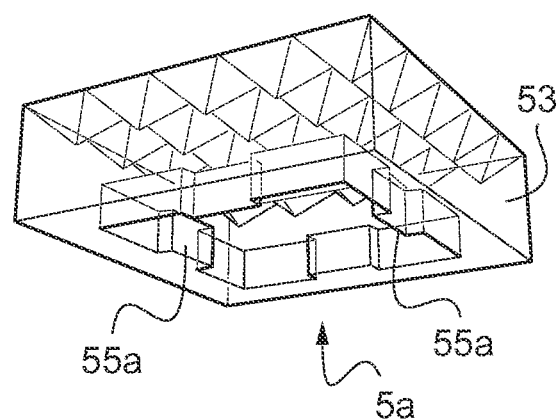
Fig.1n
Fig.1o
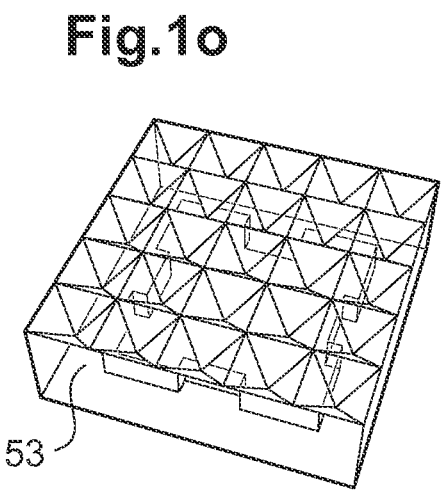

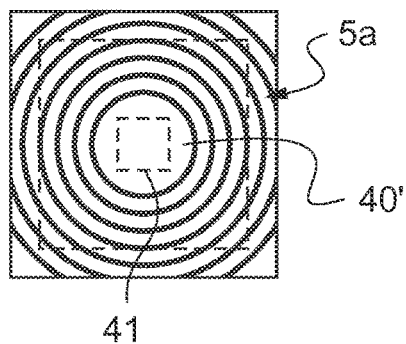
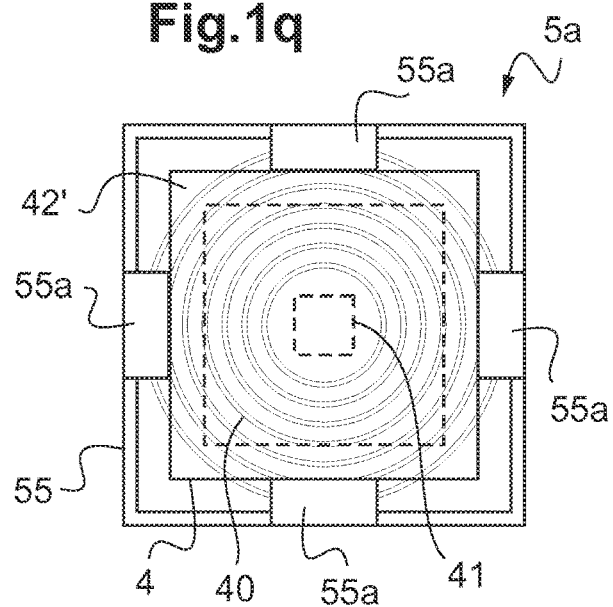
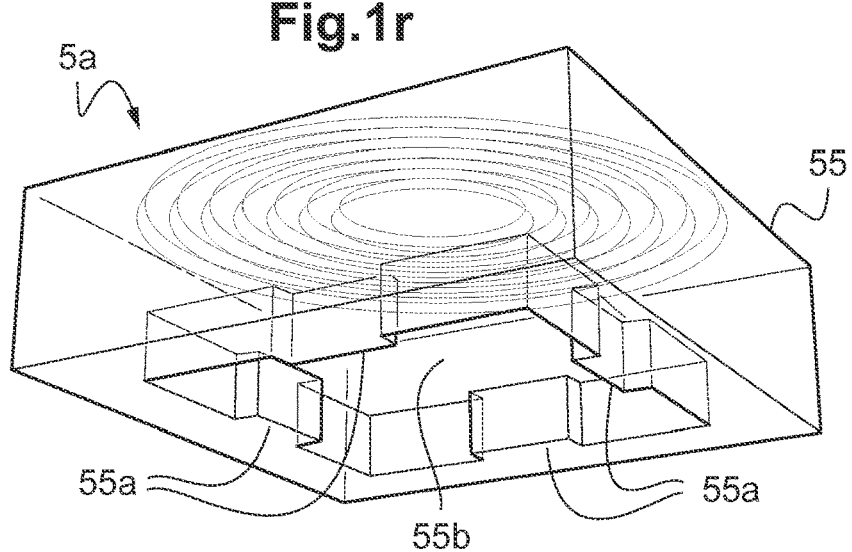
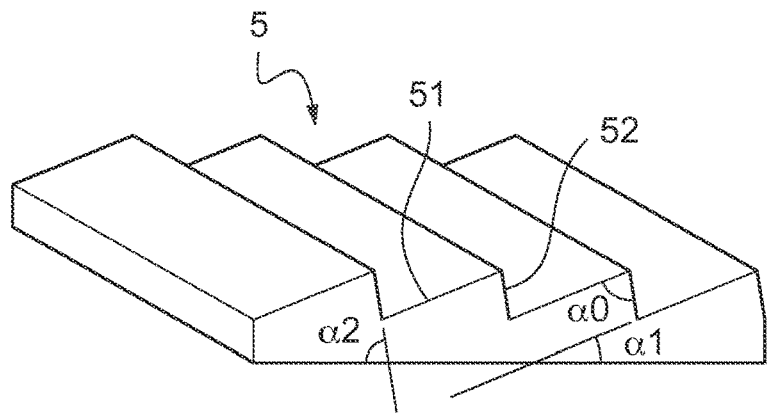

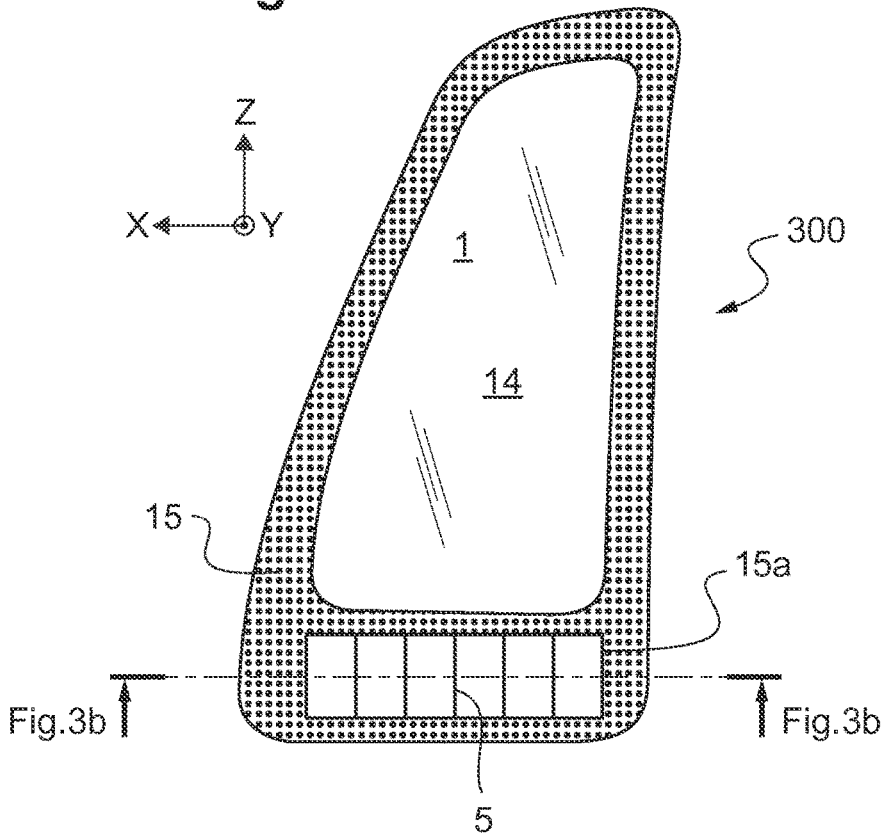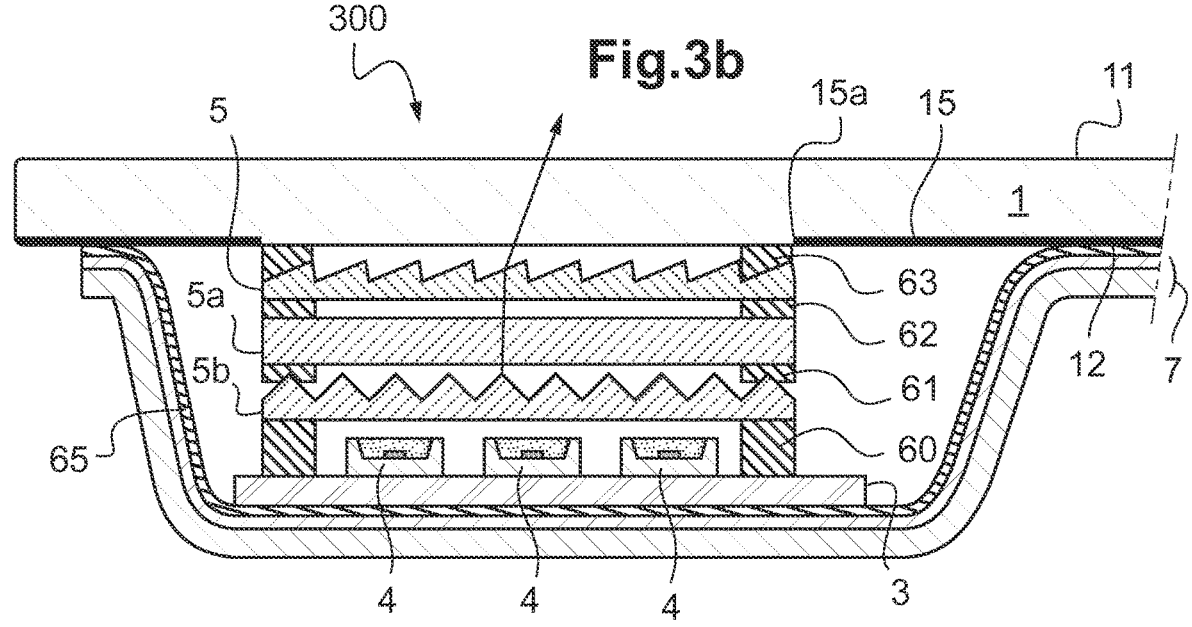

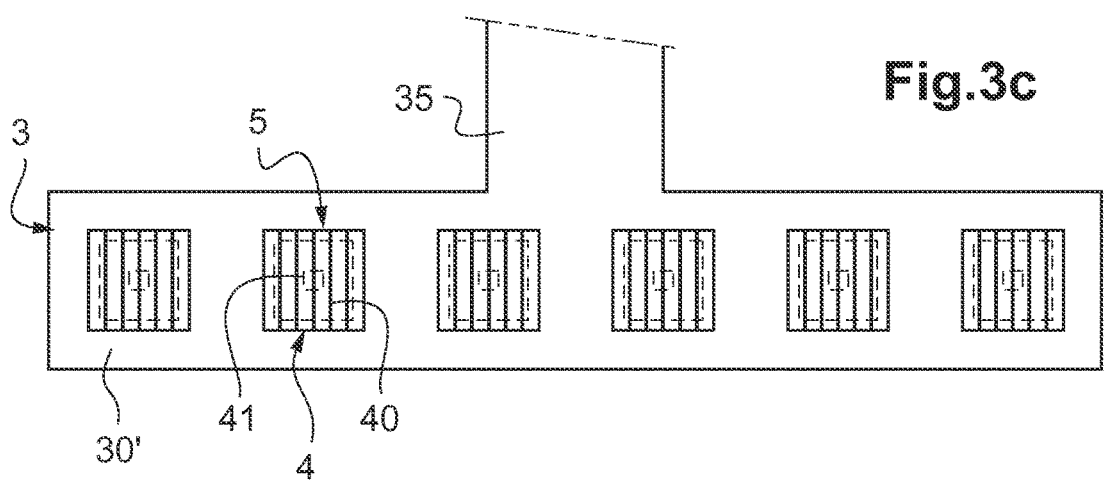
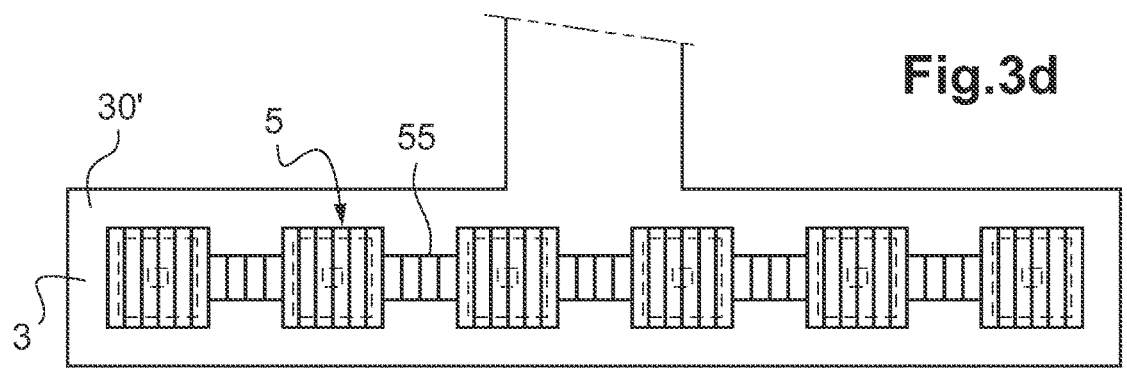
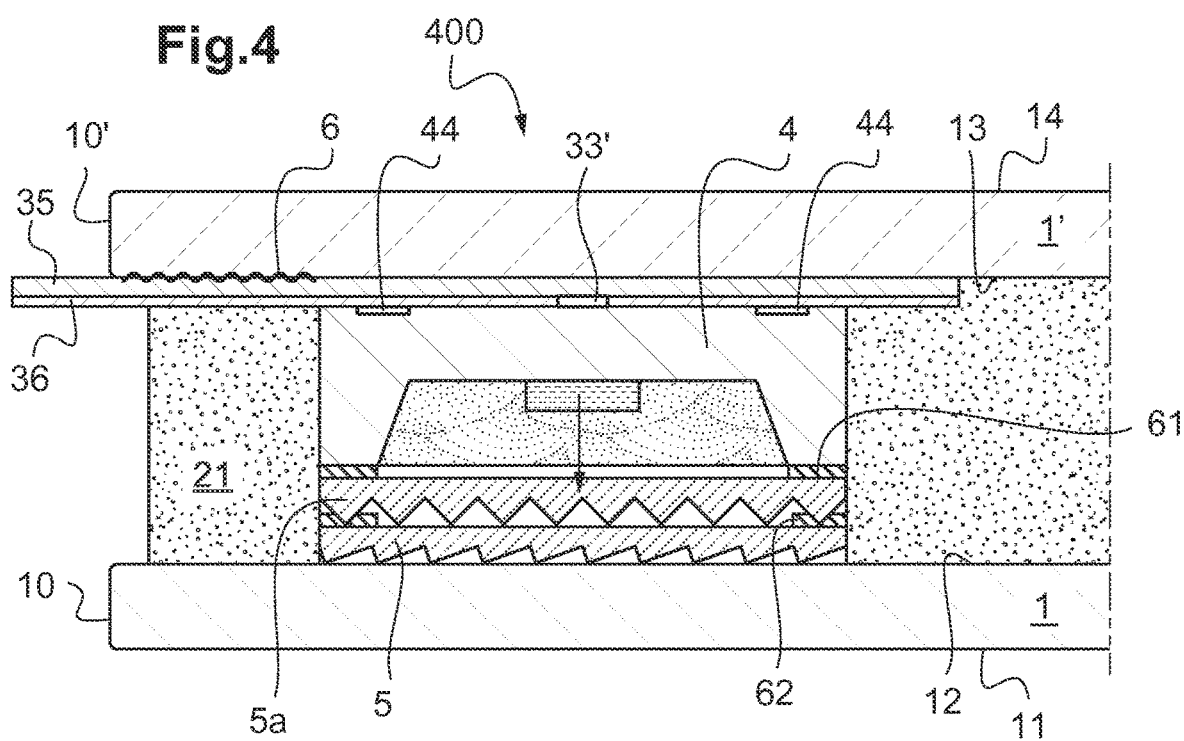

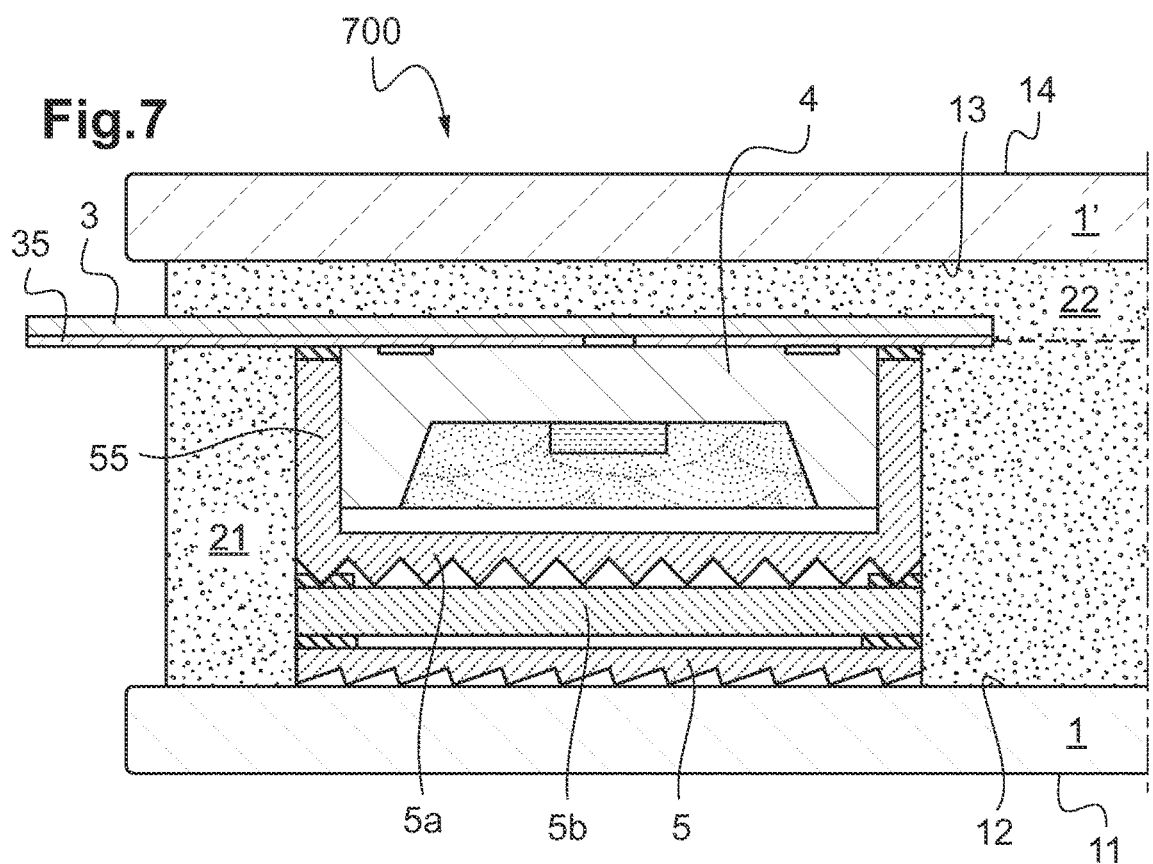
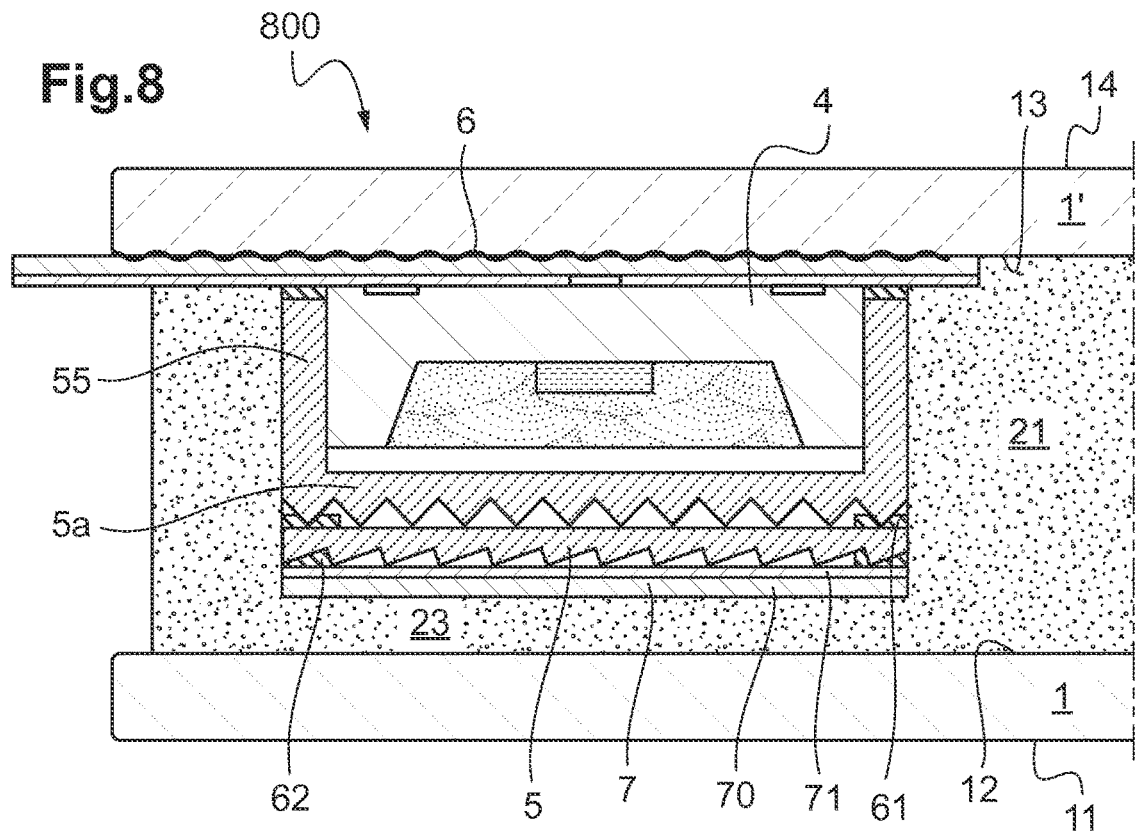

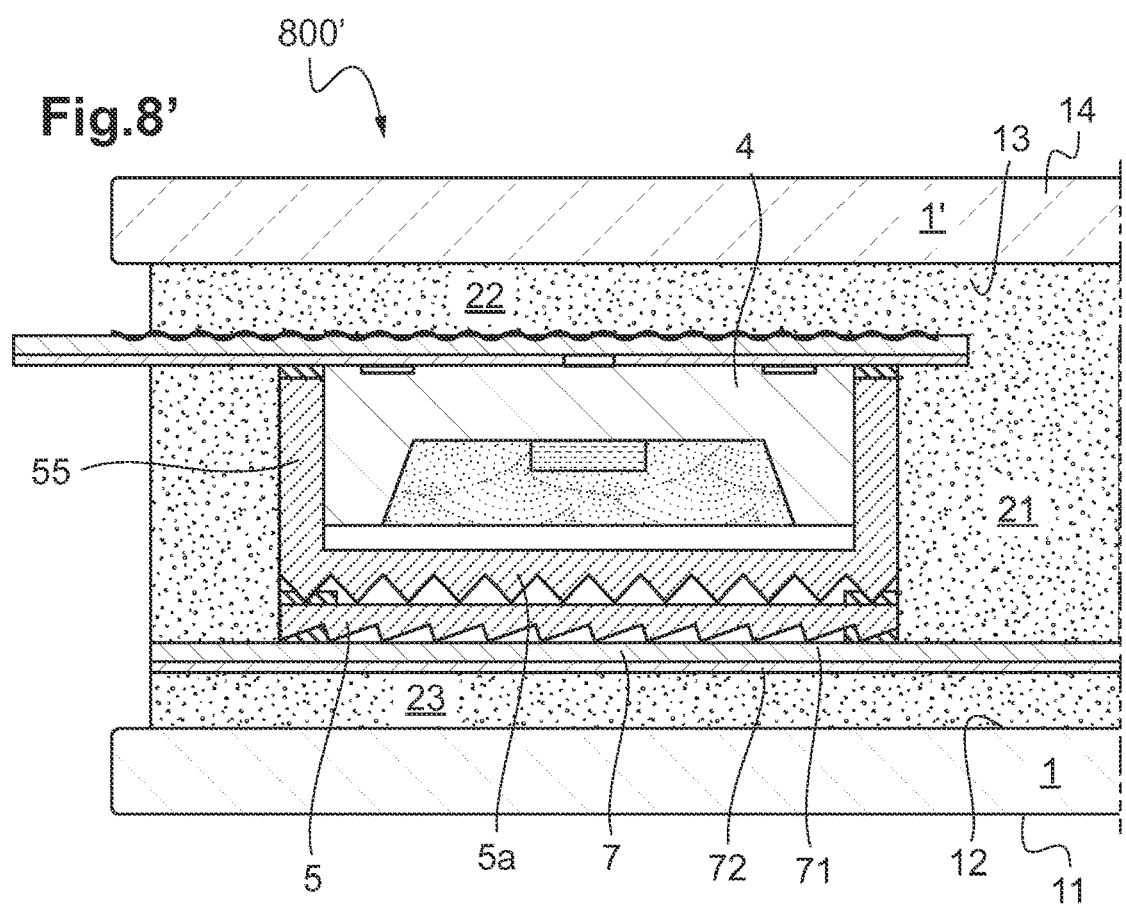
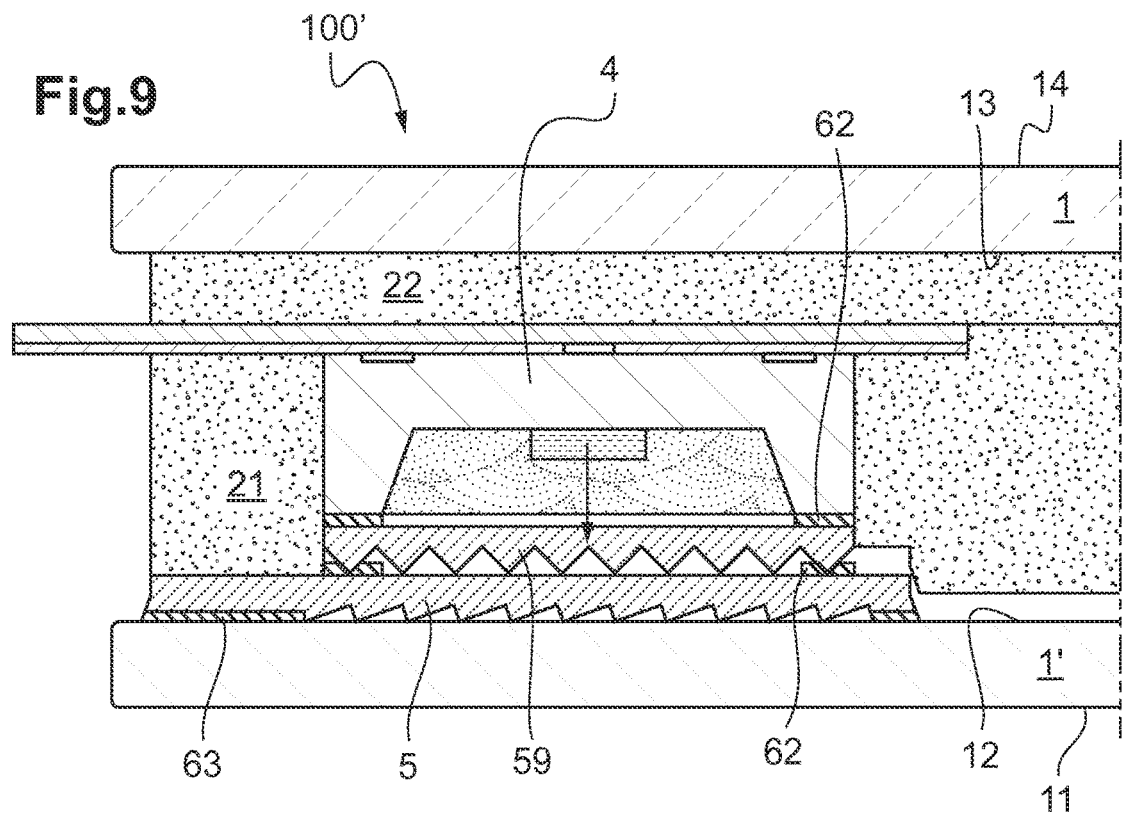

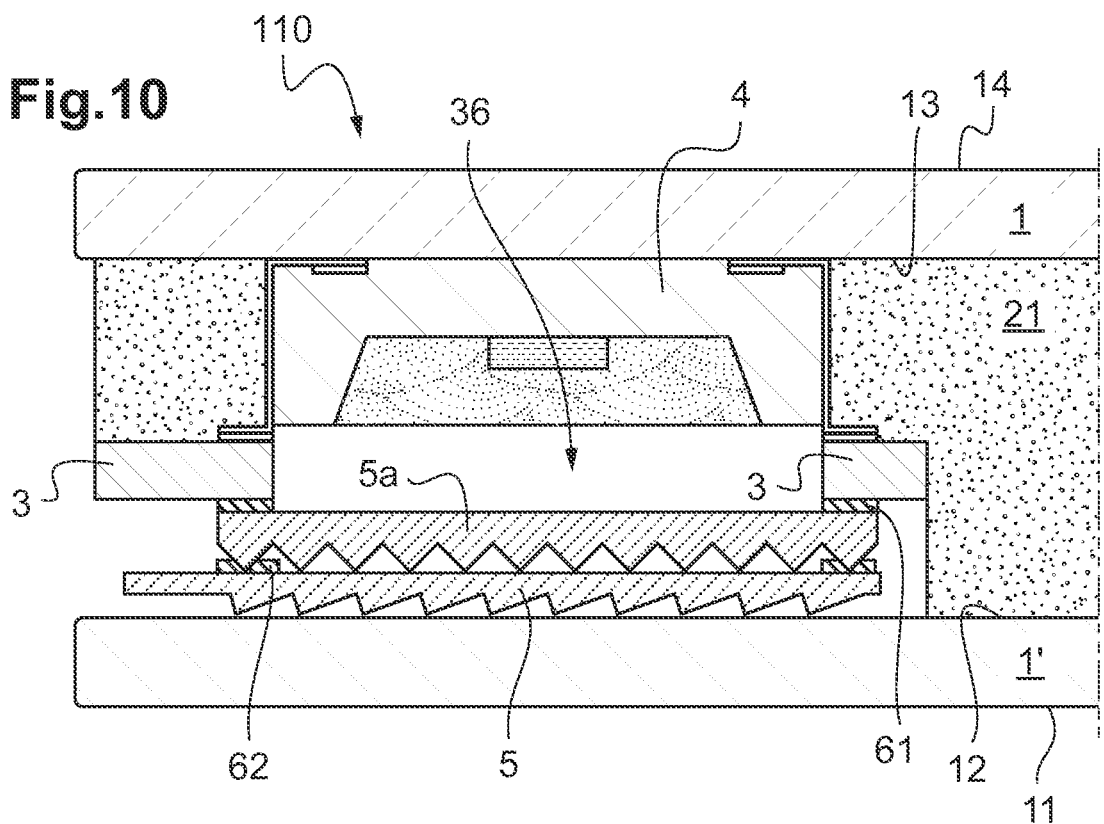
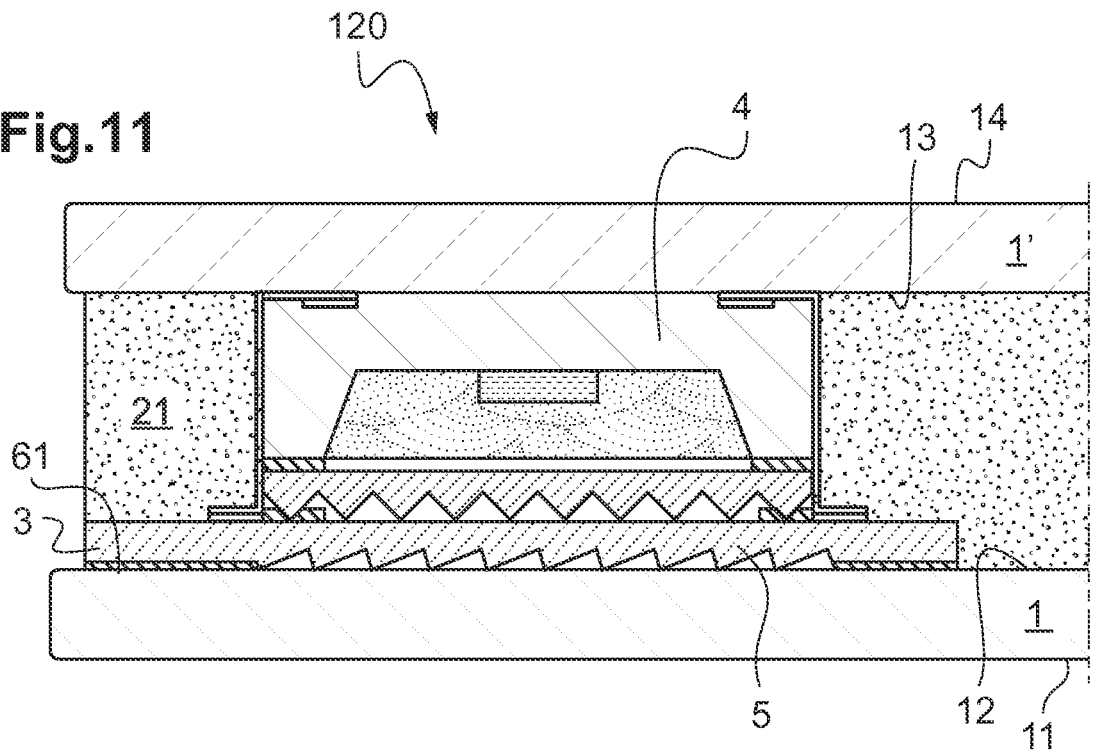

EXTERNAL LUMINOUS SIGNALING VEHICLE GLAZING, VEHICLE INCORPORATING SAME AND MANUFACTURE

CROSS-REFERENCE TO RELATED APPLICATIONS

This application is the U.S. National Stage of PCT/FR2018/053021, filed Nov. 28, 2018, which in turn claims priority to French patent application number 1761477 filed Nov. 30, 2017. The content of these applications are incorporated herein by reference in their entireties.

The invention relates to an external luminous signaling vehicle glazing and to a vehicle including such a glazing and to the manufacture of such a glazing.

External luminous signaling vehicle glazings are increasingly common. In particular it is common to place a lighting unit on the internal face called face F2 in order to form a 3rd stoplight.

The integration and the manufacturing process may be improved.

To this end, the first subject of the present patent application is an external luminous signaling vehicle glazing, chosen from a rear window and a side window (preferably fixed, deflector) or a windshield, in particular a motor-vehicle rear window, side window or windshield or even a rear window, side window or windshield of a public-transport vehicle, comprising:
  a first transparent glazing, made of mineral glass, in particular (thermally or chemically) tempered mineral glass or organic glass that is optionally clear or extra-clear and preferably curved, which is intended to be the exterior glazing, with first and second main faces, called face F1 (face exterior to the vehicle) and face F2, respectively, and, for a motor vehicle, this glazing in particular being made of mineral or organic glass of thickness preferably of at most 2.5 mm, even of at most 2.2 mm—in particular 1.9 mm, 1.8 mm, 1.6 mm and 1.4 mm—or even of at most 1.3 mm or of at most 1 mm in thickness, preferably with what is called a reference direction
  a light source face-F2 side and able to emit the external signaling light, said light source having an exit surface toward the face F2, which is a set of inorganic light-emitting diodes, each diode including at least one semiconductor chip preferably in a package, each chip being (having at least one emitting face) able to emit in the direction of the face F2, and each diode in particular having an edge face and a front surface (in the plane of the front face of the package) and said diode even preferably having a width W4 (maximum dimension normal to the optical axis) of at most 10 mm and even of at most 8 mm and better still the width of the assembly consisting of the diode an optional primary optic is at most 15 mm and even at most 8 mm, each diode being of preferably submillimeter thickness $e2$ and for example of thickness larger than 0.2 mm—in particular the thickness of the assembly consisting of the diode and optional primary optic being larger than 0.2 mm and preferably submillimeter-sized.

In a first configuration (with integrated collimation), each diode incorporates a primary optic (dome, etc.) with an output emission half angle at the apex of at most 50° and even of less than 50° and a main emission direction normal to the plane of the emitting face (and of the face F2).

In a second configuration (with added collimation), each diode has an emission half angle at the apex of 50° to 70° and a main emission direction normal to the plane of the emitting face (and of face F2)—without primary optic —, the glazing furthermore including a set of collimation optics, in particular made of transparent preferably plastic material, in particular a thermoplastic (in particular polyethylene terephthalate PET, polyethylene naphthalate PEN, polyethylene PE, polymethyl methacrylate PMMA, polydimethylsiloxane PDMS, polyamide, polyimide, polyacrylate, polyester, polycarbonate PC, polysulfones, polyethersufones, thermoplastic polyurethane).

It is possible to have a collimation optic that is common to the diodes (collimation optics forming a common optic) or preferably individual (spaced apart collimation optics).

Each collimation optic may be flexible and preferably is; the collimation optic includes, and even is, an optical film of (total) thickness E1 that is submillimeter-sized and better still at most 0.6 mm or 0.3 mm or 0.15 mm, which is preferably plastic (in particular thermoplastic, PET, PE, PC, PMMA, PDMS), said film in particular being partially textured in its thickness or alternatively a composite film including a smooth transparent (in particular chosen from the aforementioned plastics) carrier with a transparent—organic and/or mineral—overlayer that is partially or entirely textured in its thickness, or a set of preferably plastic (in particular chosen from the aforementioned plastics) optical films.

Each collimation optic being associated with a light-emitting diode, each collimation optic includes a front face toward the face F2 and an opposite rear face. The collimation optic, made of transparent material, includes an array of features with apexes S and with a pitch T between apexes that is from 10 μm to 500 μm, with preferably at least 4 or even 10 features facing the exit surface; the collimation optic includes:
  a) a first optical element (film, plate, portion of a part) with on the front so-called collimation face opposite to the exit surface, said array of features that are two-dimensional, in particular a textured film with said (first) array, in particular with a thickness of at most 0.3 mm or 0.2 mm or 0.15 mm
  b) or a set of at least two optical elements that are prismatic, preferably of at most two prismatic optical elements, including in this order starting from the exit surface:
    a first optical element (film, plate, portion of a part with extension, for example—of submillimeter-sized thickness) with a (front) main face opposite to the exit surface, said array of features that are prisms extending longitudinally along a first axis, in particular a first film textured with said (first) array, in particular with a thickness that is submillimeter-sized and even of at most 0.3 mm or 0.2 mm or 0.15 mm
    and facing the first optical element (preferably spaced apart therefrom by a most 1 mm or fixed on its periphery for example by adhesive bonding or welding), a second optical element, preferably an optical film—on the first optical film or a plate portion of a part with extension—, for example—of thickness that is submillimeter-sized and even of at most 0.3 mm or 0.2 mm or 0.15 mm, with on a (front) main face opposite to the exit surface, a second array of features that are prisms extending longitudinally along a second axis making an angle to said first axis of 90±10°, preferably 90±5°, 90±2° and even of 90°, in particular a film textured with said second array, the first or the second axis makes with the reference direction an angle of at most 10°, better still of at most 5° and even of at most 2°, and is even parallel (angle of 0°), c) or a single first optical element (film, plate, portion of a part for example—of submillimeter-sized thickness) with on the front so-called collimation face opposite to the exit surface said array of features that are prisms, in particular a film textured with said (first) array, extending longitudinally along an axis making an angle of at most 10° better still at most 5° and even at most 2° to the reference direction and even parallel, in particular with a thickness that is submillimeter-sized and even of at most 0.3 mm or 0.2 mm or 0.15 mm d) a single first optical element (film, plate, portion of a part for example—of submillimeter-sized thickness, portion of a part for example—of submillimeter-sized thickness) forming a set of Fresnel prisms and even a Fresnel lens, which are on the front so-called collimation face opposite to the exit surface or on the rear face.

In the first and in the second configuration, the glazing furthermore comprises facing the collimation optic or primary optic:

a (so-called asymmetric) redirection optic, between the collimation optic or the primary optic and the face F2 and preferably on the collimation optic (fixed to its periphery, for example by adhesive bonding or welding, or spaced apart therefrom by a most 1 mm), made of a transparent preferably plastic (in particular thermoplastic, polyethylene terephthalate PET, polyethylene naphthalate PEN, polyethylene PE, polymethyl methacrylate PMMA, polydimethylsiloxane PDMS, polyamide, polyimide, polyacrylate, polyester, polycarbonate, polysulfones, polyethersufones, thermoplastic polyurethane) material, —for example the same material as the (last) (optical) collimation film or the (optical) collimation films—, which is preferably of submillimeter-sized thickness E'1, includes a preferably plastic (chosen from the aforementioned plastics) optical film or a set of preferably plastic (chosen from the aforementioned plastics) optical films, each including on a main face opposite to the exit surface an array of asymmetric prisms with apexes and with a pitch T' between apexes that is from 10 μm to 500 μm, preferably with a least 4 or even 10 features facing the exit surface (or light-emitting area), the redirection optic thus includes:

i) a first asymmetric optical film that is prismatic with said array of asymmetric prisms extending longitudinally along a third axis making an angle of at most 10°, at most 5° or at most 2° to said first axis and even parallel and/or to the reference direction of the glazing and even is parallel, in particular with a thickness that is submillimeter-sized and even of a most 0.3 mm or 0.2 mm or 0.15 mm j) or a set of two asymmetric optical films that are prismatic, including in this order starting from the exit surface:

a first asymmetric optical film with on a main face opposite to the exit face (called the intermediate face) an array of asymmetric prisms, extending longitudinally along a third axis, in particular with a thickness that is submillimeter-sized and even of at most 0.3 mm or 0.2 mm or 0.15 mm, making an angle of at most 10° to the reference direction and/or the first axis and facing the first asymmetric optical film (preferably spaced apart therefrom by at most 1 mm or fastened to its periphery for example by adhesive bonding or welding) a second asymmetric optical film in particular with a thickness of at most 0.3 mm or 0.2 mm or 0.15 mm, with on a main face opposite to the exit surface, called the final front face, with a second array of prismatic features—which array is crossed with the first array of prismatic features-, extending longitudinally along a fourth axis making an angle to said third axis of at most 10°, preferably of at most 5°, at most 2° and even of 0° (parallel), the fourth axis makes an angle to the reference direction (and even the first axis), of at most 10° at most 5° or at most 2° (or 0°).

For i) and j) each asymmetric prism is defined by first and second longitudinal faces the prism preferably having a length L and a width W with L>2 W and better still L>5 W or L>10 W.

Each asymmetric prism has an angle at the apex a'0 ranging from 50 to 60° better still of 55°±5° or 55°±2° and the first longitudinal face (called the long side) makes with the plane of the asymmetric optical film a first angle a3, ranging from 31 to 41° better still of 35°±5° or 35°±2° (naturally the second longitudinal face (called the short side)) preferably makes with the plane of the film a second angle a4, ranging from 79 to 99° or 90° better still from 85 to 90°, from 88 to 90°, and preferably of at most 90°. Preferably, the difference a4-a3 is larger than 40° and even than 50°. In particular, for i) and j):

all or some of the asymmetric prisms being pointed with the two longitudinal faces planar and secant at the apex S1 each pointed prism being defined by said angle at the apex a'0 all or some of the asymmetric prisms being rounded with the two longitudinal faces (each curved or at least partially curved optionally with a planar portion then curved toward the apex), in a plane P normal to the plane of the film and normal to said axis of the prism, the intersection between the plane P and each rounded prism forms a section including two curves C'1, C'2 that are contiguous to the apex S1, first and second straight lines D'1 and D'2 passing through the inflection points I'1 and I'2 of the two curves C'1, C'2 are defined, a first straight line D'1 making said angle a3 to the plane of the film, a second straight line D'2 making said angle a4 to the plane of the film, each rounded asymmetric prism being defined by a circle tangent to the apex S1 with a radius of curvature R1 comprised between T'/10 and T'/5 (the straight lines D'1 and D'2 are secant and make said angle at the apex a'0).

When the asymmetric prisms are contiguous valleys—which are pointed or rounded—are defined with the same tolerances in the angle in the valley as in the angle at the apex described above and in the optional radius of curvature in the valley.

Furthermore, in the first and in the second configuration:

the normal to the long side directed toward the face F2 is oriented toward the top of the rear window or toward the front of the side window.

Furthermore, to preserve the collimation and/or redirection function:

air is between the exit surface (which is smooth or already textured in order to promote light extraction, such as with a lenticular array etc.) and the rear face of the first optical element of the collimation optic (smooth face, without coating, without micron-sized texture, etc.), in particular the first optical element (film), being spaced apart from the exit surface preferably by a most 1 mm or fastened to its periphery for example by adhesive bonding and with an optional spacer or even by welding, optionally makes physical (non-optical) contact, optionally makes physical contact with the exit surface, and for example is spaced apart therefrom by at most 1 mm for b) and c) air is between the prisms of the front face of the collimation optic, and in particular the apexes of the features are spaced apart or make physical contact with a transparent element (optional second film or asymmetric prismatic film); for d) air is between the Fresnel prisms (of the Fresnel lens)

for a) the two-dimensional features are recessed, the array of two-dimensional features is an array of cavities (the wall of each cavity forming the flank in particular the contiguous secant lateral faces or the conical flank), the apexes S are oriented to opposite the face F2 and the top surface of each cavity (in particular defining the outline of the base) is spaced apart from or in physical contact with the (first) asymmetric prismatic film, or the two-dimensional features are raised and oriented toward the face F2, the apexes of the features of each front face are spaced apart or in physical contact with the (first) asymmetric prismatic film and air is between the two-dimensional features the front (final) face of the last asymmetric prismatic film is spaced apart from or in physical contact with a distinct transparent element in particular of thickness that is preferably subcentimeter-sized (protective and/or functional film, face F4 of a second glazing if the glazing is laminated) and even of at most 0.3 mm, 0.15 mm or corresponding to the first glazing (face F2 of the first glazing).

In a third alternative configuration to the collimation/redirection optic assembly described above, the glazing includes, facing the exit surface (preferably without primary optic for simplicity's sake) a holographic redirection optic, in particular made of a transparent material that is preferably plastic, in particular thermoplastic (preferably made of polyester or of polyethylene terephthalate PET, polyethylene PE polycarbonate PC, polymethyl methacrylate PMMA, polystyrene, polyamide, polydimethylsiloxane PDMS, polyethylene naphthalate PEN, polyimide, polyacrylate, polysulfone, polyethersulfone, thermoplastic polyurethane), preferably on the exit surface (fastened to its periphery, for example by adhesive bonding or even welding or spaced apart therefrom by at most 1 mm); the holographic redirection optic includes a front face toward the face F2 and an opposite rear face; the holographic redirection optic, includes, better still is, an in particular plastic film with an array of holographic features (one-dimensional and for example prismatic features) on the front face, preferably of thickness that is submillimeter-sized and even of at most 0.3 mm or 0.15 mm.

Furthermore, in this third configuration, air is between the exit surface and the entrance face of the holographic redirection optic, air is between the raised holographic features of the final front face of the holographic redirection optic, or air is in the recessed holographic features of the front face of the holographic redirection optic; the front face of the holographic redirection film is spaced apart or makes physical contact with a distinct transparent element that is of thickness that is preferably subcentimeter-sized (protective and/or functional film, face F4 of a second glazing if the glazing is laminated) and even of at most 0.3 mm or 0.15 mm or corresponding to the first glazing.

Furthermore, in the first and in the second configuration and even the third:

the reference direction for the rear window or the windshield is the horizontal in the plane of the window (for a redirection toward the ground)

and the reference direction for the side window is the normal to the horizontal in the plane of the window (between the lateral edges) for a redirection toward the rear the normal to the long side directed toward the face F2 is oriented toward the top of the rear window or of the windshield or toward the front of the side window.

According to the invention, to guarantee their effectiveness, any even transparent material (adhesive, lamination interlayer) is avoided between the features of each film and in particular an air gap is created between the exit surface and the rear face of the first optical film.

A physical contact (film against exit surface) is tolerated but an air-filled cavity achieved by a peripheral fastening (preferably by adhesive bonding) with or without spacer is preferred (better controlled thickness, less risk of iridescent zones).

According to the invention, the (even each) peripheral fastening is preferably entirely outside (offset from, therefore peripheral to) the light-emitting area. The width of the fastening may be at most 5 mm.

The assembly consisting of the light-emitting element, (plate and/or film) primary or collimation optic and redirection optic may be flat, parallel to face F2, and pressed or adhesively bonded on its periphery against face F2 or face F4 of a laminated glazing. The assembly consisting of the light-emitting element and holographic redirection optic may be flat, parallel to face F2, and pressed or adhesively bonded on its periphery against face F2 or face F4 of a laminated glazing.

This assembly is compact, of total thickness of at most 10 mm or even of at most 5 mm.

The (collimation and redirection) films may together form a stack that is fastened on its periphery to the exit surface. The one or more optical films according to the invention are effective, simple to implement and may be thin with a total thickness of at most 1 mm or even 0.5 mm or 0.3 mm.

According to the invention, the spellings asymmetric and assymmetric are used interchangeably.

For the rear window, the assembly consisting of the light source and collimation optic and redirection optic may form a (third) stoplight or an indicator (side repeater) light, a position light or a sidelight.

For the rear window or windshield, the assembly consisting of the light source (preferably without primary optic) and holographic redirection optic may form a (third) stoplight or an indicator (side repeater) light, a position light, a sidelight or the light source forms a symbolism such as an in particular horizontal pictogram (symbol, letters, monogram signs, etc.) on the lower or lateral border of the window (rear window or windshield) or even in the center of the window (rear window or windshield), this symbolism in particular being a warning pictogram such as a hazard warning light, traffic warning, etc. and/or this symbolism being a pictogram providing information in particular on safety distance.

The light source may be a strip that is straight or curved, for example along (the length of) a curved edge or a masking outline (opaque masking layer for example made of enamel etc.) of the window.

For example (for the rear window or the windshield) the light source preferably emits in the (MV) red and in particular is a luminous strip that is preferably rectangular and peripheral and that even is horizontal.

For example (for the rear window or the windshield) the light source preferably emits in the (MV) yellow and in particular is a luminous strip that is preferably rectangular and peripheral and that even is horizontal, in particular horizontal on the lower or lateral border of the window.

In particular, the light source is a rectangular and peripheral, and in particular horizontal, luminous strip on the lower or lateral border of the rear window; the assembly consisting of the light source (diode) and collimation optic and redirection optic in particular forms an indicator (side repeater) light, a position light, a sidelight or the assembly consisting of the light source (preferably diode without primary optic) and holographic redirection optic forms an indicator (side repeater) light, a position light or a sidelight.

In particular the light source (preferably a plurality of diodes with or without primary optic) forms a symbolism such as a pictogram and in particular is horizontal on the lower or lateral border of the window or even in the center of the window, this symbolism in particular being a warning pictogram such as a hazard warning light, a traffic warning, etc., or this symbolism even being a pictogram providing information in particular on safety distance.

In particular, the light source (preferably a diode without primary optic) emits in the (MV) red, and in particular is a preferably rectangular and peripheral luminous strip that is therefore on the border of the vision area and in particular on the upper border of the window (face F4 or F2) and centered, the assembly consisting of the light source (preferably a diode without primary optic) and collimation optic and redirection optic forming a third stoplight, a position light or a sidelight or the assembly consisting of the light source and therefore diode (preferably without primary optic) and holographic redirection optic forming a third stoplight, a position light or sidelight.

In particular, (for the rear window or the windshield) the light source emits in the (MV) yellow, and in particular is a preferably rectangular and peripheral luminous strip that is therefore on the border of the vision area and in particular on the lower border of the window (face F4 or F2), the assembly consisting of the light source and the collimation optic and the redirection optic for example forming an indicator light or the assembly consisting of the light source and holographic redirection optic forming for example an indicator (side repeater) light.

To produce a (MV) red—or yellow—light for the rear window it is possible to a use a source that emits a white light and then use a red—or yellow—color filter. A local protective film between the final front face and face F2 may be said color filter (of red and/or any other necessary color).

The rear window may be in a trunk door, a utility vehicle door or even be a back window.

The light source may be opaque (via its diode carrier) and/or masked from the interior by a masking layer (on F4 if laminated glazing and source between F2 and F3) or by a protective film.

It may be desired to prevent the light from entering the interior (mono directional) in particular via the side window and windshield.

The light source may be transparent (overall transparency, the diode carrier is transparent) and/or masked from the interior by a masking layer (on F4 if laminated glazing and source between F2 and F3) or by a protective film.

An exterior masking layer (on face F2) may be provided with an aperture plumb with the light source.

One or more lights of other colors: blue, orange, green, etc., may be desired.

Provision may be made for a plurality of luminous zones ((a plurality of series of diodes on separate or common diode carriers) each being a strip of rectangular, square or any other desired shape) with an optionally identical color and that are controlled together (on and off simultaneously for example)—that perform the same function for example—and that, for example, are spaced apart by at most 80 mm or 75 mm.

The rear (or side) window (or windshield) may include a plurality of sets of diodes each with a holographic redirection optic or with an assembly consisting of the primary or collimation optic and the redirection optic, said light sources (diodes) in particular on the upper border of the rear window emitting an optionally identical color For the windshield it may be a question of a forward-directed light such as a DRL (daytime running light) or a symbolism, a luminous pictogram, etc.

For the side window, which is in particular fixed, as a deflector, the light-source assembly may form an indicator (side repeater) light or the assembly consisting of the light source and the holographic redirection optic may form an indicator (side repeater) light For example, the light source emits in the (MV) yellow, and is a preferably rectangular, peripheral luminous strip that is therefore on the border of the vision area and in particular on the lower or lateral and even rear lateral border, the assembly consisting of the light source and the primary or collimation optic and the redirection optic forming a side-repeater indicator light or the assembly consisting of the light source and holographic redirection optic forming a side-repeater indicator light.

The side window may be of rectangular or quadrilateral shape (smaller top edge).

To produce an (MV) yellow light for the rear window it is possible to a use diodes that emit a white light and then use a yellow color filter. A local protective film between the final front face and face F2 may be said filter.

The diodes may also be/form a symbolism or a pictogram.

For example, for a side window a plurality of sets of diodes are chosen, each with a holographic redirection optic or with an assembly consisting of a primary or collimation optic and a redirection optic, said sets of diodes in particular being spaced apart by at most 85 mm and being arranged horizontally or even vertically (or laterally at least).

The features (prisms or two-dimensional features) are preferably as close as possible to one another and for example their bases are separated by less than 1 mm and preferably by less than 0.5 mm.

Even more preferably, the prisms or the two-dimensional features and the asymmetric prisms are contiguous or essentially contiguous.

Features (prisms etc.) are said to be contiguous when they touch each other in at least one portion of their surface. It is preferable for the features to be contiguous because they are thus more numerous and effective. For example, for each prismatic film, there is one set of prismatic features that are one-dimensional along the longitudinal axis, the bases of which features are contiguous.

Certain two-dimensional features do not allow complete contiguousness between the features. This is in particular the case when if the bases are circles, even if they touch, there remains a certain area between the circles not belonging to the features. By complete contiguousness, what is meant is the fact that the outline of the base of a feature also in its entirety forms part of the outlines of the neighboring features thereof.

Certain features may be completely contiguous, so that the entirety of the area (at least the functional area facing the diode) of the optical film forms part of at least one feature. It is a question of a tessellation. In particular, two-dimensional features with square or rectangular or hexagonal bases may be completely contiguous if electroluminescent the bases are identical. In the case of square or rectangular bases, said bases should also be aligned if the features are to be completely contiguous. In the case of hexagonal bases, it is advisable for said bases to form a honeycomb.

Preferably the collimation optic and/or the redirection optics does not extend beyond the edge face of the first glazing.

The glazing includes a plurality of diodes (or even a plurality of sets of diodes); it may preferably include one collimation optic and even one asymmetric redirection optic per diode or one common collimation optic, and even one common redirection optic, for a plurality of diodes.

Preferably, for the optical films according to the invention, it is preferably a question of repetitive features, i.e. geometric features having substantially the same shape and placed at substantially equal distance from one another and even of substantially the same height.

Of course, the shape of the zone covered by the collimation or redirection optic is independent of the shape of the features.

A two-dimensional feature may therefore be:
raised and therefore solid, for example with a conical or pyramidal surface, and in particular with secant lateral faces separated by lateral ridges; or
recessed (in other words inverted)—the film is textured with an array of cavities, the one or more walls of each cavity forming the pyramidal lateral faces or the conical flank; the apex is oriented toward opposite the face F2 and the top surface of the cavity defines the outline of the base.

The two-dimensional features for example end in a tip, such as is the case for a cone or a pyramid.

Preferably, each two-dimensional feature has the planar and secant (lateral) faces of a pyramid. If a two-dimensional feature is a regular pyramid, the base (comprised in the general plane of the textured face of the film) is an equilateral triangle.

A conventional cone does not have any planar surfaces on its flank.

The entrance of each optical element may have a low roughness so as to prevent any scattering. Independently of the roughness, it is possible to define a feature (texture) depth or height that is equal to the distance between the highest point and the lowest point of a feature.

The features (prisms or two-dimensional features) preferably are about 10 µm to 500 µm in height and better still between 100 and 300 µm in height, and preferably have a height of at least 50 µm and of at most 200 µm.

The height of each optical film (collimation optic and redirection optic) may be comprised between 5 µm and 1 mm, preferably between 10 µm and 500 µm, and in particular between 20 and 300 µm, and is preferably at least 50 µm and at most 200 µm.

The transparent optical film may be a film made of a plastic (organic polymer) material chosen from the plastics already mentioned and is preferably made of polyester, of polyethylene terephthalate or PET, polycarbonate or PC or polymethyl methacrylate PMMA.

The transparent optical film is preferably flexible in order to match the one or more curvatures of the (monolithic or laminated) glazing if it is curved.

The optical film (collimation optic or redirection optic) may comprise a plastic film with, on its surface, a transparent layer with said features, the thickness of said layer being partially or entirely textured.

Preferably, each optical film (collimation optic and redirection optic) is a (monolithic) plastic film the thickness of which is partially textured; in other words there is a constant thickness between the smooth entrance face and the closest point of the textured front face (F2-side). Preferably, the remaining (constant) thickness of the film is defined as the distance between the lowest point between the textured front face and the rear face. The remaining thickness is at least 50 µm and even at most 200 µm.

The texture may be produced by rolling (i.e. cast), thermoforming, etching and in particular laser etching for a polymer material. Depending on the shape of the desired texture, the manufacture may not necessarily lead to perfect geometric shapes: rounded valley or apex, etc.

The collimation optic according to a) or b) or d) may be a first textured transparent film.

The collimation optic according to c) may be a first textured transparent film and a crossed second textured transparent film.

The redirection optic according to i) may be a first textured transparent film.

The redirection optic according to j) may be a first textured transparent film and a crossed second textured transparent film.

Preferably, regarding the collimation optic and/or the redirection optic, the following preferably cumulative features are preferred:
the or each optical film it is a plastic film that is partially textured in its thickness, the height H of the features preferably having a dispersion of at most 10%
for a) the two-dimensional features are recessed, the plastic film in particular being partially textured in its thickness; the two-dimensional features have a rectangular, square or circular base and preferably have a height H with a dispersion of at most 10%; the features are in particular (almost) of the same height and therefore have top surfaces in the same plane
for a), b) or c) the angle at the apex A1 is 90°±5° and even the angle A2 is 45°±5° and even the angle at the apex A1 is 90°±2° and even the angle A2 is 45°±2°
for i) and j) the angle at the apex A1 is 55°±5° and even the angle A2 is 35°±5° and even the angle at the apex A1 is 55°±2° and even the angle A2 is 35°±2°

A Fresnel prism is a succession of prisms of small size and constant angle. These prisms are placed contiguously parallel to one another.

The Fresnel prism therefore comprises an alternation of oblique surfaces and surfaces that are essentially perpendicular to the base of the prism and to the general plane of the glazing. The Fresnel focal length may be at most 3 mm.

The diodes may be on a preferably flexible carrier called the diode carrier in particular of thickness e'2 that is sub-millimeter-size and preferably at most or less than 0.2 mm, which:

(for conventional mounting) is further from the face F2 than the diodes for reverse mounting is between the diodes and face F2, said carrier optionally be being apertured plumb with the diodes.

The diodes may be reversed mounted for example on face F2, which face is in particular provided with an electrically conductive (preferably transparent) layer made up of two or more zones for electrically connecting the diodes, which zones are isolated via one or more insulating strips that are in particular submillimeter-sized in width; it may be a question of an electrically conductive layer covering face F2 and furthermore having a function as a solar control and/or heating layer, or even of electrically conductive (local) tracks.

In the case of a laminated glazing, the diodes may be on face F3, which face is in particular provided with an electrically conductive (preferably transparent) layer made up of two or more zones for electrically connecting the diodes, which zones are isolated via one or more insulating strips that are in particular submillimeter-sized in width; it may be a question of an electrically conductive layer covering face F2 and furthermore having a function as a solar control and/or heating layer, or even of electrically conductive (local) tracks.

A diode may be of the chip-on-board type or even most preferably a surface mount device (SMD) then including a peripheral package.

In one preferred embodiment, each, preferably power, diode is an electronic component including at least one semi-conductor chip and is equipped with an in particular polymeric or ceramic peripheral package encapsulating the edge face of the electronic component (and defining the edge face of the diode), said package surrounding the semiconductor chip.

The package can correspond to the maximum thickness (height) e2 of the diode. The package is, for example, made of epoxy. A polymeric package can optionally shrink (the final thickness after lamination can be less than the initial thickness) during the lamination. The (polymeric) package can be opaque.

The package (which is monolithic or made of two parts) may comprise a portion forming a support bearing the chip and a portion forming a reflector that flares with distance from the support above the chip, and containing a protective resin and/or a material having a color conversion function. The front surface may be defined as the surface of this material covering the chip, this surface being set back from or level with the "front" surface of the reflector.

Preferably, the one or more diodes are components that are surface mounted on the front face of the diode carrier and the one or more diodes may even have a Lambertian or quasi-Lambertian emission pattern.

The width of the diode carrier, which may be a printed circuit board (PCB), is preferably at most 5 cm, better still at most 2 cm, and even at most 1 cm. The width (or length) of a diode with a single semiconductor chip, generally a square-shaped diode, is preferably at most 5 mm. The length of a diode with a plurality of semiconductor chips (typically surrounded by the package), generally of rectangular shape, is preferably at most 20 mm, better still at most 10 mm.

The diode carrier may be local (for example cover at most 20% or at most 10% of the area of the laminated glazing) and optionally contain through-apertures in order to make it more inconspicuous.

The diodes are preferably power diodes that in operation are under supplied electrically with current, preferably by a factor of at least 10 and even of at least 20 (therefore intensity/10 or even intensity/20) in particular so as to maintain a temperature below the reflow temperature of the polymeric material of the lamination interlayer, and in particular a temperature of at most 130°, better still of at most 120° C. and even of at most 100° C.

These diodes guarantee an excellent efficiency without excessively heating.

For example, for diodes supplied with current at 1A, between 50 and 100 mA is chosen.

The inorganic diodes are, for example, based on gallium phosphide, gallium nitride or aluminum gallium nitride.

The diode carrier (PCB board) may be sufficiently malleable (flexible) to adapt to the curvature of the curved laminated glazing.

In one embodiment, the diode carrier includes a film made of a preferably transparent plastic material, preferably of polyethylene terephthalate or PET or of polyimide, provided with preferably transparent conductive tracks that are in particular metal (copper etc.) or made of transparent conductive oxide, and equipped with surface mount diodes. The conductive tracks are printed or deposited by any other deposition method, for example physical vapor deposition. The conductive tracks can also be wires. It is preferable for the conductive tracks and the film to be transparent when they are visible, that is to say when they are not masked by a masking element (layer) (such as an enamel, indeed even a paint, and the like), in particular on face F4 or F3. The conductive tracks can be transparent due to the transparent material or due to their width, sufficiently thin to be (virtually) invisible.

Polyimide films have a higher temperature withstand than alternative PET or even PEN (polyethylene naphthalate) films.

The diode carrier may be local for example occupying at most 20% or at most 10% of the area of the laminated glazing or essentially cover faces F2 and F3 and preferably bears a low-emissivity or solar-control and/or even heating functional coating.

Preferably, the diode carrier, alone or associated with a flat connector, extends at least as far as to the edge face of the laminated glazing and preferably extends beyond the edge face, the diode carrier for example comprising a first portion with the one or more diodes and a narrower portion that extends beyond the glazing; and, between the rear face of the diode carrier and face F2, is housed an adhesive that is impermeable to liquid water, of thickness of at most 0.1 mm and better still at most 0.05 mm, in particular a double-sided adhesive. Such an adhesive is preferred to an overmolding solution. It may be a question of the preferably transparent adhesive used to attach (all) the diode carrier.

The diode carrier may include:
  a (rectangular) first portion bearing the one or more diodes;
  and a (rectangular) electrical-connection second portion, said portion leading to and even extending beyond the edge face of the laminated glazing.

This second portion may be (much) longer than the first portion and/or narrower than the first portion. The diode carrier may include a diode-bearing first portion that is apertured (in order to be more inconspicuous).

Preferably, the first portion is at least 2 mm wide. The diode carrier may have a doglegged shape and in particular be L-shaped.

The diode carrier may be associated with a flat connector that extends as far as the edge face of the glazing and that even extends beyond said face. A flexible connector that is able to adapt to the curvature of the glazing, including a plastic, PEN or polyimide for example, is preferred. The flat connector may be of width (dimension along the edge face) smaller than or equal to the dimension of the diode carrier along the edge face.

The glazing may include a plurality of groups of diodes (and therefore, preferably through-, apertures) with the same function or distinct functions.

The diodes (on a diode carrier) may emit the same light or light of different colors, preferably not at the same time.

To obtain a larger luminous area and/or different colors there may be—on a given diode carrier—a plurality of rows of diodes or indeed two diode carriers may be placed side-by-side (at least the first portions of the diode carriers, i.e. with the diodes, are placed side-by-side).

The diode carrier may be entirely or partially in the vision area of the roof and optionally spaced apart from opaque peripheral strips (even forming an opaque frame), such as strips of a (black, dark, etc.) masking enamel. Most often, there is an opaque layer on face F2 and an opaque layer on face F4, indeed even F3. Their widths are identical or distinct.

The width Li of an opaque peripheral strip on face F2 and/or F3 and/or F4 is preferably at least 10 mm and even 15 mm. Thus, the length of the diode carrier may be larger than Li.

The diode carrier (at least the first portion with the one or more diodes and/or at least the (second) portion without the diodes, in particular for electrical connection and preferably extending beyond the edge face of the first glazing) may be arranged in or in the vicinity of the region of an opaque layer, in particular a (black) enamel, along a peripheral edge of the glazing, generally on face F2 and/or if laminated on face F4 or even on face F2 and/or face F3.

Thus, in a first embodiment, the diode carrier may even be located in a region of the glazing, in which region the exterior glass is entirely (or partially) opaque because of the presence of an opaque layer (the most external opaque layer), such as a layer of (black) enamel, on F2. This opaque layer may, in this region of the glazing, be an unapertured layer (continuous background) or a layer with one or more discontinuities (areas without opaque layer), said layer for example taking the form of a set of optionally geometric (circular, rectangular, square etc.) features that are of identical or distinct size (of size that decreases with distance from the edge face and/or the features getting further and further apart with distance from the edge face).

In this first embodiment, the one or more diodes or even the diode carrier may be visible only from the interior and therefore masked (from the exterior) by the opaque layer on face F2.

Alternatively or cumulatively to the first embodiment, the diode carrier may be placed in a region of the glazing, in which region the interior glass is opaque because of the presence of an opaque layer (the most internal opaque layer), such as a layer of (black) enamel, preferably on F4 or even on F3. This opaque layer then includes at least one or more apertures (produced using a mask during deposition or by removing the opaque layer, in particular with a laser) in line with each diode. This opaque layer for example takes the form of a set of optionally geometric (circular, rectangular, square, etc.) opaque features that are of identical or distinct size (of size that decreases and/or the features getting further and further apart with distance from the edge face). Zones between the opaque features are in line with the diodes.

Mention may be made, as diodes, of the Oslon Black Flat range sold by Osram. For red light, mention may be made, as diode sold by Osram, of: Oslon Black Flat Lx H9PP. For amber light, mention may be made, as diode sold by Osram, of: LCY H9PP.

Mention may be made, as flexible PCB, of the Akaflex® range of products (in particular PCL FW) from Krempel.

With reverse-mount diodes, the face of the diode carrier face F3 site may be textured (embossing, etc.) to form the collimation optic.

In one embodiment of the vehicle, it includes at least one control unit for driving the diodes and even at least one sensor, in particular for detecting luminosity. A control unit for driving the diodes may be in the laminated glazing, on the glazing, on or off the diode carrier.

In one embodiment, the diodes are reverse-mount diodes, the face of a diode carrier face-F2 side is textured to form the collimation optic or the collimation optic is a textured plate or film on the optionally apertured carrier or the diode carrier is apertured and the diodes bear the primary optic.

In one embodiment, the glazing comprises a part mounted on a diode carrier and/or mounted on the diode or on a group of diodes, said part including:
  the collimation optic, in particular a textured plate, or the asymmetric or holographic redirection optic (for example said collimation optic is based on one or more films that are adhesively bonded on their periphery to the exit surface)
  a peripheral extension extending in the opposite direction to the face F2 along the edge face of the diode, and even making contact with said edge face of the diode.

In one embodiment, the peripheral extension may be a surround of the diode or of the group of diodes and in particular makes contact with a preferably through-aperture of a lamination interlayer.

In one embodiment, the peripheral surround has a housing for accommodating the diode or a group of diodes, the wall of the surround in particular includes stubs for holding the diode or the group of diodes.

The textured plate must have a low roughness so as to prevent any scattering. Independently of the roughness, it is possible to define a texture depth or height that is equal to the distance between the highest point and the lowest point of a feature.

The features have dimensions that are preferably between 10 μm and 500 μm and better still between 100 and 300 μm and preferably at least 50 μm in size.

The textured plate is partially textured in its thickness, in other words it has a constant thickness between the smooth face and the closest point of the textured face. Preferably, the remaining (constant) thickness of the plate is defined as the distance between the lowest point between the textured face (rear face if array of prisms) and the opposite face (rear face if array of prisms). The remaining thickness is at least 50 μm and even at most 200 μm.

The textured plate (and even the part) may be made of a thermoplastic polymer such as a polyurethane or a polycarbonate (PC) or a polymethyl methacrylate (PMMA). It may be a question of a molded part made of PMMA or PC. The texture may be produced by rolling (i.e. cast), thermoforming, etching and in particular laser etching for a polymer material. Depending on the shape of the desired texture, this process may not necessarily lead to perfect geometric shapes: ridge or rounded apex.

The peripheral extension and/or the textured plate may be entirely housed in the optionally common and preferably through-aperture. The peripheral extension and/or the textured plate do not protrude from the interlayer face.

The peripheral extension may take the form of at least one attaching foot (part of L-shaped cross section) and preferably of at least two attaching feet (the part is of U-shaped cross section):

fastening the collimation (or holographic redirection) optic to the diode, the one or more fastening feet being on either side of the edge face of the diode and spaced apart from or on the diode carrier, said fastening being achieved by press fitting or by adhesive bonding preferably beyond the front surface of the diode or the group of diodes (in order to retain an entrance air gap), fastening the collimation (or holographic redirection) optic to each diode of the group of diodes, the one or more fastening feet being on either side of the edge face of the diode and spaced apart from or in contact with the diode carrier, said fastening being achieved by press fitting or by adhesive bonding preferably beyond the front surface of the diode or the group of diodes (in order to retain an entrance air gap), fastening the collimation (or holographic redirection) optic to the diode carrier.

The peripheral extension preferably forms a surround of the diode in the preferably through-aperture or of the group of diodes in the common, preferably through-, aperture. The part is of U-shaped cross section.

The surround preferably comprises a housing for accommodating the diode or group of diodes and in particular the wall of the surround includes stubs for holding the diode or the group of diodes, the stubs preferably being regularly distributed, and preferably at least two in number.

The height of the extension (surround) is preferably at a distance of at the most 0.3 mm, or even preferably at most 0.1 mm from the face FB.

In one embodiment, the asymmetric redirection optic includes a film against or fastened to the periphery of the front face of said functional portion in particular by a preferably transparent adhesive In one alternative embodiment to mounting of a part on-diode (with extension) or on a diode carrier, the collimation optic may be a textured transparent film between the face F3 and the lamination interlayer with the one or more preferably through-apertures. The collimation optic is then common to all the diodes. Regions of the textured transparent film covering the zone with the set of diodes may be textured, and therefore the textured transparent film may contain one or more textured regions each facing one diode or groups of diodes, adjacent regions being smooth (in order to preserve transparency).

The textured transparent film may be a film made of plastic (organic polymer), and preferably of polyethylene terephthalate, polycarbonate, polymethyl methacrylate or polystyrene.

However, a solution with a set of collimation optics mounted in apertures that are preferably through-apertures is preferred.

In one embodiment, the holographic or asymmetric redirection optic is against or fastened to the transparent element on the periphery of the final front face for example to face F2 or face F4 of a laminated glazing including a second transparent glazing made of mineral or organic glass, with main faces called faces F3 and F4, in particular fixed by a preferably transparent adhesive.

In one embodiment, the collimation optic includes an optical film fastened to the diode on the periphery of the exit surface, fastened via its rear face, preferably by an in particular transparent adhesive, and even of the emitting surface, and the asymmetric redirection optic includes a film against or fastened to the periphery of the final front face of the collimation optical film in particular by a preferably transparent adhesive or the holographic redirection optic includes a film against or fastened to the periphery of the front surface in particular by a preferably transparent adhesive.

The glazing (windshield, rear or side window) may comprise:

a second (transparent) glazing, intended to be the interior glazing, which is made of preferably curved and preferably clear or extra-clear or even tinted (less than the first glazing) mineral glass, with third and fourth main faces, face F3 and face F4, respectively, and, for motor vehicles, preferably of thickness smaller than that of the first glazing, even of at most 2 mm—in particular 1.9 mm, 1.8 mm, 1.6 mm and 1.4 mm—or even of at most 1.3 mm or of less than 1.1 mm or even of less than 0.7 mm and in particular of at least 0.2 mm, the total thickness of the first and second glazings preferably being strictly smaller than 4 mm, and even than 3.7 mm, the second glazing possibly being chemically toughened between faces F2 and F3, which are the internal faces of the laminated glazing, a "transparent", optionally clear, extra clear or even tinted, in particular grey or green lamination interlayer (tinted above all if the apertures are through-apertures) made of preferably thermoplastic polymeric material and better still made of polyvinyl butyral (PVB), said lamination interlayer film (single sheet or composite sheet) having a main face FA face-F3 side and a main face FB face-F2 side, the face FA possibly making adhesive contact with the face F3 (which is uncoated or coated with a coating) and the face FB possibly making adhesive contact with the face F2 (which is uncoated or coated with a coating), lamination interlayer of thickness EA between the face FA and FB—which for a motor vehicle—is preferably at most 1.8 mm, better still at most 1.2 mm and even at most 0.9 mm (and better still at least 0.3 mm and even at least 0.6 mm), said interlayer, in particular being a first acoustic and/or tinted sheet, in particular being set back from the edge face of the first glazing by at most 2 mm and set back from the edge face of the second glazing by at most 2 mm Said lamination interlayer is for example provided, between face FA and face FB, with a (through- or blind) aperture or a set of M>1 apertures that are preferably through-apertures or that form blind holes, each aperture being of width WA (larger than or equal to the diode and collimation and even redirection optic in the aperture) of at most 20 mm and even of at most 15 mm.

Each diode may be associated with one through-aperture or one blind hole housing (encircling the edge face of) the diode and even housing (all or some) of a collimation optic, or at least one group of said diodes is associated with a given what is called common through-aperture or a what is called common blind hole, housing the group of diodes and even housing (all or some) of an in particular common collimation optic.

In particular:

when the aperture is a through-aperture and the face FB makes contact with the face F2, the front surface of the diode is preferably set back from the face F2 when the aperture is a through-aperture and when the diode is reverse mounted and the face FA makes contact with the face F2, the diode is preferably set back from face F3 (from face FA), when the hole is blind, the remaining thickness, called the bottom thickness Hf, is at most 0.3 mm and/or at least 0.1 mm or 0.2 mm.

Thus, the present invention provides local cut-outs of the lamination interlayer which are dedicated to the diodes. In particular, the need to cut all the way around the diode carrier (PCB board) as was the practice in the prior art, which increased the risk of a poor-quality assembly (bubbles, delaminations, esthetic defects) is avoided. In particular, the optional diode carrier is quite thin in order to avoid the need to have to add a PVB sheet on the back face of the carrier. The group of diodes in a common (blind or through-) hole may be inscribed in an area S of width or length of at most 20 mm. The lamination interlayer is preferably as close as possible to the diodes and preferably allows for the tolerance in the position of the diodes during the production of the cut-out, which is chosen to be wider, preferably, than the width of the diodes (even if the interlayer is malleable).

The preferably through-aperture of the lamination interlayer facilitates its installation, its integration and improves its performance.

Completely unexpectedly, in the case of a through-aperture the interlayer does not flow enough to adversely affect the operation of the collimation or redirection optic.

In one preferred embodiment, the thickness, preferably of PVB, between face FA and face FB, which ranges from 0.7 to 0.9 mm (a single sheet or a first and second sheet), is made of PVB, the diodes are surface mount devices on the front face of the diode carrier, of thickness is at most 0.2 mm and better still at most 0.15 mm and even at most 0.05 mm.

In particular in the case of a single sheet—with the through apertures—in particular an optionally acoustic tinted or clear PVB, the diode carrier (which is sufficiently malleable to adapt to the shape of the curved laminated glazing) may be adhesively bonded to or pressed against face F3 or face F2 in a reverse-mount configuration, e'2 is at most 0.15 mm and even at most 0.1 mm and the adhesive bonding may in particular be achieved with an adhesive (glue or preferably a double-sided adhesive).

The entire length of the carrier or discrete points, in the diode zone and/or outside the diode zone, is/are adhesively bonded. The peripheral adhesive may form a seal to liquid water.

The diode carrier may be local (for example cover at most 20% or at most 10% of the area of the laminated glazing) and optionally contain through-apertures in order to make it more inconspicuous.

The glazing may comprise a sheet, in particular the lamination interlayer, made of thermoplastic material, between the back face of the diode carrier and face F3 or face F2 in reverse-mount configuration.

The lamination interlayer, formed from one or more films—between the face FA and FB and/or a sheet on the back face and/or even a sheet between the face FA and the face FB—may be made of polyvinyl butyral (PVB), of polyurethane (PU), of ethylene vinyl acetate copolymer (EVA), and for example have a thickness of between 0.2 mm and 1.1 mm.

It is possible to choose a conventional PVB such as RC41 from Solutia or Eastman.

The lamination interlayer may comprise at least one what is called central layer made of viscoelastic plastic with vibro-acoustic damping properties, in particular based on polyvinyl butyral (PVB) and plasticizer, and the interlayer, and furthermore comprising two external layers made of standard PVB, the central layer being between the two external layers. Mention may be made, as an example of an acoustic sheet, of the patent EP 0 844 075. Mention may be made of the acoustic PVBs described in the patent applications WO2012/025685, WO2013/175101, in particular tinted as in WO2015079159.

Preferably, the glazing has at least one of the following features:
    the (individual or common) preferably through-aperture is in a thickness of PVB (or in one or more sheets, the interface(s) of which are in particular discernible),
    the (individual or common) preferably through-aperture is in an in particular three-layer or four-layer acoustic lamination interlayer,
    the (individual or common) preferably through-aperture is in a tinted lamination interlayer (in particular masking a little the diode carrier)
    the (individual or common) aperture is in a composite (multisheet) material: PVB/transparent plastic film or even PVB/transparent plastic film/PVB, said plastic film, in particular a PET film of thickness that is submillimeter-sized and even at most 0.2 mm or at most 0.1 mm bearing a functional coating: providing a low emissivity or solar control function and/or even a heating function;
    the spacing between (individual) through-apertures is at least 0.1 mm or better still at least 0.2 mm and preferably at most 50 cm
    the spacing between diodes of (individual) separate through-apertures is at least 0.1 mm or better still at least 0.2 mm
    the spacing between diodes in a common through-aperture is at least 0.1 mm or better still at least 0.2 mm and even at most 1 mm.

Naturally, the PVB may make direct contact (via its face FA) with the face F3 (F2 via its face FB, respectively) or with a conventional functional coating on this face, in particular a stack of thin layers (including one or more silver layers) such as: a heating layer, antennae, a solar-control or low-E layer or a decorative or (opaque) masking layer such as a generally black enamel.

The glass, preferably the internal glass, which in particular is thin and of thickness smaller than 1.1 mm, is preferably chemically tempered. It is preferably clear. Mention may be made of the examples of patent applications WO2015/031594 and WO2015066201.

Preferably:
    the diodes with their collimation optics are in (preferably) through- or blind apertures of a PVB or in through- or blind apertures of a PVB/functional film with an optional functional coating/PVB
    or the (preferably) through- or blind aperture is common to the diodes of the group of diodes and a portion of the collimation optical part forms a spacer between the diodes or a spacer between the diodes is a part that is separate from the collimation optical part.

In one embodiment, the glazing includes a laminated glazing including:
    said first transparent glazing,
    a second transparent glazing made of mineral or organic glass, with main faces called faces F3 and F4,
    between the faces F2 and F3, which are the internal faces of the laminated glazing, a transparent lamination interlayer that is preferably made of PVB and that is optionally tinted and/or optionally composite in its thickness, made of polymeric material, this lamination interlayer film having a main face FA face-F3 side and a main face FB face-F2 side, face FA making adhesive contact with face F3 and face FB making adhesive contact with face F2, and, preferably:

the collimation optic is larger than the diode and is fastened on its periphery and preferably adhesively bonded by an in particular transparent adhesive to or on its periphery makes adhesive contact via its rear face with said lamination interlayer and optionally the asymmetric redirection optic is larger than the diode and is fastened on its periphery and preferably adhesively bonded by an in particular transparent adhesive via its rear face to the collimation optic or the primary optic or the collimation optic is fastened on its periphery and preferably adhesively bonded by an in particular transparent adhesive to the exit surface and the asymmetric redirection optic is larger than the diode and is fastened on its periphery and preferably adhesively bonded by an in particular transparent adhesive to said lamination interlayer or makes on its periphery adhesive contact via its rear face with said lamination interlayer or the holographic redirection optic is larger than the diode and is fastened on its periphery and preferably adhesively bonded by an in particular transparent adhesive to said lamination interlayer or makes on its periphery adhesive contact via its rear face with said lamination interlayer.

In one embodiment, the glazing includes a laminated glazing including:

said first transparent glazing, a second transparent glazing made of mineral or organic glass, with main faces called faces F3 and F4, between the faces F2 and F3, which are the internal faces of the laminated glazing, a transparent lamination interlayer that is optionally tinted and/or optionally composite in its thickness, made of polymeric material, this lamination interlayer film having a main face FA face-F3 side and a main face FB face-F2 side, face FA making adhesive contact with face F3 and face FB making adhesive contact with face F2.

In one embodiment, face F2 is free, the glazing is monolithic, the asymmetric or holographic redirection optic is on face F2 or if the glazing is laminated (as described above) and the diode is on the side of the free face F4, the collimation optic is fastened on its periphery preferably by adhesive bonding, to the diode, via its rear face, in particular by a preferably transparent adhesive on the periphery of the exit surface and/or the assembly consisting of the diode/primary or collimation optic/asymmetric redirection optic is fastened, and preferably adhesively bonded, to the free face F4 or F2 via a protective rear film that is on a diode carrier with a fastening portion that extends onto the free face F4 or F2 or the assembly consisting of the diode/holographic redirection optic is fastened, and preferably adhesively bonded, to the free face F4 or F2 via a protective rear film that is on a diode carrier with a fastening portion that extends onto the free face F4 or F2.

In one embodiment:

the collimation optic and preferably the asymmetric redirection optic is between face F2 and F3, the diode is between face F2 and F3 and, in the zone with the diode, the face FB makes adhesive contact with the face F2 and the face FA makes adhesive contact with the rear surface of the diode carrier, the transparent element being the second glazing or the holographic direction optic is between face F2 and F3, the diode is between face F2 and F3 and, in the zone with the diode, the face FB makes adhesive contact with the face F2 and the face FA makes adhesive contact with the rear surface of the diode carrier, the transparent element being the second glazing.

In one embodiment, the holographic redirection optic or the primary or collimation optic and preferably the asymmetric redirection optic is between face F2 and F3, the diode is between face F2 and F3 and in the zone with the diode the face FA makes adhesive contact with the face F3 (in particular of the so-called rear PVB sheet) or on the side of the exit surface (in particular of the so-called front PVB sheet), and the face FB makes adhesive contact with the face F2 and the transparent element is a plastic protective film, on the final front face, with a face (of the protection film) oriented toward the face F2 and makes adhesive contact with the lamination interlayer (in particular front PVB), said protective plastic film being local optionally with a so-called extension zone extending beyond the edges of the final front face of the holographic or asymmetric redirection optic by at most 10 cm.

In one embodiment, the lamination interlayer is composite and includes the following stack outside of the diode zone: PVB/functional plastic film with an optional electrically conductive functional coating face-F2 or face-F3 side/PVB, the functional plastic film extending over face F2. Furthermore, the diode is between the face F2 and F3, between the front face and face F3 is present said functional plastic film/said PVB, and the transparent element is the functional plastic film on the front face of the asymmetrical holographic redirection optic.

The lamination interlayer may include an acoustic PVB and/or is tinted; the lamination interlayer in particular is a PVB that is at least partially tinted in its thickness, the tinted portion being at least between the diode and face F3.

In one embodiment, the diode is housed in an aperture of the lamination interlayer and preferably the collimation or primary optic and the asymmetric redirection optic are housed in said aperture or the holographic redirection optic is housed in said aperture, the aperture is blind with a bottom in the direction of the face F3 and opens onto face F2, or the so-called internal aperture is in the thickness of the lamination interlayer and said transparent element is a protective film housed in said internal aperture or larger then said internal aperture and covering the said internal aperture.

Each diode may be an electronic component equipped with an in particular polymeric or ceramic peripheral package encapsulating the edge face of the electronic component, said package in particular defining the edge face of the diode and surrounding the semiconductor chip, and preferably they are surface mount devices mounted on a diode carrier.

The glazing may include a laminated glazing including:

said first transparent glazing a second transparent glazing made of mineral or organic glass, with main faces called faces F3 and F4, between the faces F2 and F3, which are the internal faces of the laminated glazing, a transparent lamination interlayer that is optionally tinted and/or optionally composite in its thickness, made of polymeric material, this lamination interlayer film having a main face FA face-F3 side and a main face FB face-F2 side, face FA making adhesive contact with face F3 and face FB making adhesive contact with face F2, said lamination interlayer being provided, between the face FA and the face FB, with one or a set of M apertures that are preferably through-apertures or that form blind holes each diode being associated with a through-aperture or a blind hole housing the diode or at least one group of said diodes being associated with a given what is called common, through-aperture or a given what is called common, blind hole housing the group of diodes
diodes preferably being in the one or more preferably through-apertures and/or on a diode carrier between face F2 and face FA.

In one embodiment, the diodes with their collimation or primary and asymmetric redirection optics or with their holographic redirection optics are in through- or blind apertures of a PVB sheet or in through- or blind apertures of a PVB/functional film with an optional functional coating/PVB or the through- or blind aperture is common to the diodes of the group of diodes and a portion of the collimation optical part forms a spacer between the diodes or a spacer between the diodes is a part that is separate from the collimation optical part.

In order to limit heating of the passenger compartment or to limit the use of air conditioning, the monolithic or laminated glazing is tinted, one of the glazings at least (preferably the exterior glass) is tinted, and the laminated (or monolithic) glazing may also include a layer that reflects or absorbs solar radiation, preferably on face F4 or on face F2 or F3 (on face F2 for the monolithic glazing), in particular a transparent electrically conductive oxide layer, i.e. what is called a TCO layer (on face F4 or F2 for the monolithic glazing), or even a stack of thin layers comprising at least one TCO layer, or stacks of thin layers comprising at least one silver layer (on F2 or F3), the or each silver layer being placed between dielectric layers.

It is possible to simultaneously have a (silver-containing) layer on face F2 and/or F3 and a TCO layer on face F4.

The TCO layer (of a transparent electrically conductive oxide) is preferably a layer of fluorine-doped tin oxide ($SnO_2$:F) or a layer of mixed indium tin oxide (ITO).

Other layers are possible, including thin layers based on mixed indium zinc oxides (referred to as "IZOs"), based on gallium-doped or aluminum-doped zinc oxide, based on niobium-doped titanium oxide, based on cadmium or zinc stannate, or based on antimony-doped tin oxide. In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%. For layers based on fluorine-doped tin oxide, the atomic percentage of fluorine is preferably at most 5% and generally from 1 to 2%.

ITO is particularly preferred, especially with respect to $SnO_2$:F. Of higher electrical conductivity, its thickness can be smaller to obtain one and the same emissivity level. Easily deposited by a cathode sputtering process, in particular a magnetron cathode sputtering process, these layers are characterized by a lower roughness and thus a lower tendency to foul.

One of the advantages of fluorine-doped tin oxide is, on the other hand, its ease of deposition by chemical vapor deposition (CVD), which, contrary to the cathode sputtering process, does not require a subsequent heat treatment and can be implemented on the float flat glass production line.

The term "emissivity" is understood to mean the normal emissivity at 283 K within the meaning of the standard EN12898. The thickness of the low-emissivity (TCO, and the like) layer is adjusted, depending on the nature of the layer, so as to obtain the desired emissivity, which depends on the sought-for thermal performance qualities. The emissivity of the low-emissivity layer is, for example, less than or equal to 0.3, in particular less than or equal to 0.25 or even less than or equal to 0.2. For layers made of ITO, the thickness will generally be at least 40 nm, indeed even at least 50 nm and even at least 70 nm, and often at most 150 nm or at most 200 nm. For layers made of fluorine-doped tin oxide, the thickness will generally be at least 120 nm, indeed even at least 200 nm, and often at most 500 nm.

For example, the low-emissivity layer comprises the following sequence: high-index underlayer/low-index underlayer/a TCO layer/optional dielectric overlayer.

It is possible to choose, as preferred example of low-emissivity layer (protected during a tempering), high-index underlayer (<40 nm)/low-index underlayer (<30 nm)/an ITO layer/high-index overlayer (5-15 nm)/low-index barrier overlayer (<90 nm)/final layer (<10 nm).

Mention may be made, by way of low-emissivity layer, of those described in the patent US2015/0146286, on the face F4, in particular in examples 1 to 3.

In a preferred embodiment:
the first and/or second glazing is tinted and/or the lamination interlayer is tinted in all or some of its thickness (in particular away from the side of the surface most exposed to light, often the surface where degradation occurs)
and/or one of the faces F2 or F3 or F4—preferably the face F4—of the glazing is coated with a low-emissivity layer, in particular comprising a transparent electrically conductive oxide layer ("TCO layer"), in particular a stack of thin layers with a TCO layer or a stack of thin layers with silver layer(s)
and/or face F2 or face F3 or face F4—preferably face F3—of the glazing is coated with a solar-control layer, in particular one comprising a transparent electrically conductive oxide layer (i.e. what is called a TCO layer) and in particular a stack of thin layers containing a TCO layer or a stack of thin layers containing one or more silver layers
and/or an additional tinted (polymeric, such as a polyethylene terephthalate PET, and the like) film is between the faces F2 and F3 or (bonded) on F4, indeed even on face F1.

In particular, the face F4 of the glazing is coated with a transparent functional layer, in particular a low-emissivity layer, preferably comprising a TCO layer, including a zone (supplied with electricity and thus an electrode) forming a touch button (for managing the first luminous surface).

The invention of course relates to any vehicle and in particular to an automobile including at least one glazing such as described above.

The invention also aims to simplify the process and/or to increase production rate.

To this end, one subject of the invention is a manufacturing process including, before installation on the first glazing (for example by adhesive bonding via a rear protective plastic film for example on face F2 of the monolithic glazing or F4 of a laminated glazing—or by peripheral bonding of the last optical or protective film to face F2 of the monolithic glazing or F4 of a laminated glazing—or between two glazings of a laminated glazing):
pre-mounting on each diode the film-based collimation optic and/or the film-based asymmetric redirection optic if the primary optic or holographic redirection optic is film-based and even a protective film on the last optical film, in particular by peripheral fastening and even by peripheral adhesive bonding optionally forming a seal or pre-mounting on each diode the collimation optic including a textured plate and with an extension onto the diode carrier, and preferably fastening the film-based asymmetric redirection optic and even a protective film to the last redirection or collimation optical element, in particular by peripheral fastening and even by peripheral adhesive bonding optionally forming a seal or pre-mounting on each diode with a primary optic the asymmetric (or holographic) redirection optic including a textured plate and with an extension onto the diode carrier, and even peripheral fastening of a protective film to the asymmetric redirection optic, in particular by peripheral adhesive bonding optionally forming a seal or pre-mounting on each diode the holographic redirection optic including a textured plate and with an extension onto the diode carrier, and even peripheral fastening of a protective film to the holographic redirection optic, in particular by peripheral adhesive bonding optionally forming a seal.

Preferably, all the films are fastened and even adhesively bonded peripherally so as to optionally form a seal. The part with extension may be the (collimation or redirection) first optic, which is spaced apart or on the exit surface or the last redirection optic, which is spaced apart or on the front surface of the collimation (or primary) optic.

The invention also relates to a process for manufacturing an external luminous signaling vehicle laminated glazing such as described above, which includes the following steps:

positioning the diode carrier with the diodes, diode side or carrier side, on a lamination-interlayer sheet that is unapertured or with through- or blind apertures housing the diodes preferably individually, and simultaneously or separately positioning the optional collimation optic and the redirection optic facing each diode and successively:

installation of the assembly positioned between the first and second glazings lamination under vacuum and with heating and optionally under pressure.

Thus operations are carried out off the industrial lamination line.

Each collimation-optic part or each redirection-optic part may be mounted on the diode carrier, in particular via the peripheral extension.

Preferably, before the lamination, the through- or blind hole is of thickness $E_t$ of 0.3 to 0.9 mm with in absolute value E1-Et of at most 0.3 mm or Ei-sum of the LED and optic(s) thicknesses of at most 0.3 mm.

The following may preferably be used:

a first and only sheet with a blind hole, preferably optionally acoustic PVB a first (PVB) sheet with a through- and blind hole and a second unapertured (PVB) sheet, a first (PVB) sheet with a through- and blind hole between a second unapertured (PVB) sheet and a third unapertured (PVB) sheet.

In particular:

the rear sheet F3 side is of optionally acoustic and/or tinted PVB of 0.3 to 0.9 mm thickness and/or the central sheet with through- or blind hole is optionally acoustic and/or tinted PVB $E_j$ of 0.3 to 0.9 mm thickness with in absolute value E1-E2 of at most 0.3 mm— and/or the front sheet F2 side is of clear or extra-clear and optionally acoustic PVB of thickness $E_k$ of 0.3 to 0.9 mm.

Provision may be made:

for each diode to be positioned on said lamination-interlayer sheet in a through- or blind aperture entrance-surface side, with the holographic redirection optic or with the primary or collimation optic or even indeed the asymmetric redirection optic housed in the aperture and fastened, and preferably adhesively bonded, on the periphery of the exit surface or with the asymmetric or holographic redirection optic capping the aperture and on said lamination-interlayer sheet.

for the process to include, before said positioning, fastening, in particular by peripheral adhesive bonding, a local protective film to the final front face of the holographic or asymmetric redirection optic and during said positioning said lamination interlayer has a blind hole housing the local protective film or said lamination interlayer has a through-hole and another lamination interlayer closes the hole, for said lamination interlayer having a through-hole housing each diode, and the primary or collimation optic and the asymmetric redirection optic or housing each diode and the holographic redirection optic, the process includes placing a protective film closing said hole and another interlayer sheet covering the protective film optionally already in adhesive contact with the protective film.

Lastly, the process may comprise creating point adhesive contact by heating and pressure in particular outside of the zone of the diodes or of the carrier of the diodes between said interlayer sheet and another so-called rear interlayer sheet entrance-surface side and/or between said interlayer sheet and another so-called front interlayer sheet exit-surface side, and/or between the collimation optic and the asymmetric redirection optic or the holographic redirection optic and the interlayer sheet or another interlayer sheet each diode and even the collimation optic or the primary optic and the asymmetric redirection optic or each diode and the holographic redirection optic being in a through—or blind hole of one of said interlayer sheets and/or each diode and even the primary or collimation optic and the asymmetric redirection optic or the light-emitting element and the holographic redirection optic being, as well as preferably the diode carrier, sandwiched between said interlayer sheet and the front or rear other interlayer sheet.

The creation of local adhesive contact allows the elements to remain securely fastened to one another during the rest of the process.

Provision is optionally also made to create local adhesive contact between the assembly and at least one of the first and second glazings Each adhesive contact is for example of width of at most 15 mm In particular advantageously, the local adhesive contact is created by local heating of the lamination interlayer (from 60° to 80° C. for PVB) and better still by applying pressure.

The local heating is in particular by induction, hot air, heating element, by radiation (laser etc.).

By way of heating tool (and better still pressure-applying tool) a "soldering iron" with a flat end-fitting (with a (silicone, PTFE elastomer etc.) non-stick coating able to let the heat pass), heating fingers or a hot air gun may be used.

A heating tool that allows the various point adhesive spots to be produced in a single operation may be chosen.

The present invention will now be described in greater detail with reference to the appended figures, in which.

Figure 1I:
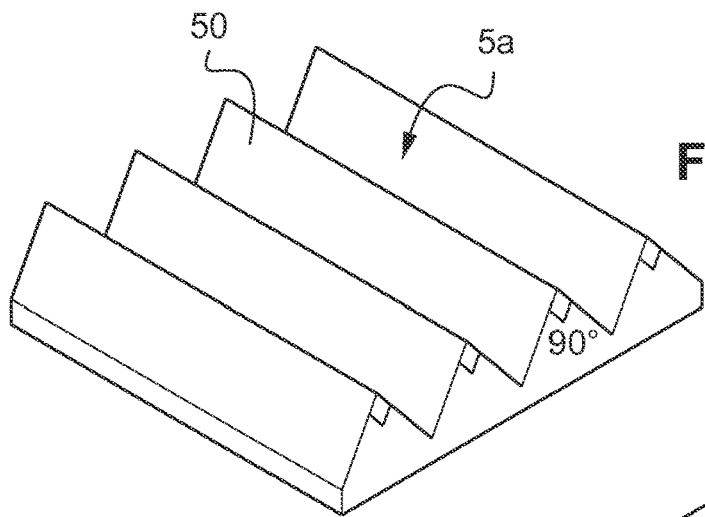
FIG. 1 is a front-on view face-F1 side of a rear windscreen with LEDs providing collimated and redirected light according to the invention.
FIG. 1a is a front-on detail view of the LEDs equipped with their collimation optic and redirection optic.
FIG. 1b is an alternative front-on detail view of the LEDs equipped with their collimation optic and redirection optic.
Figure 1J:
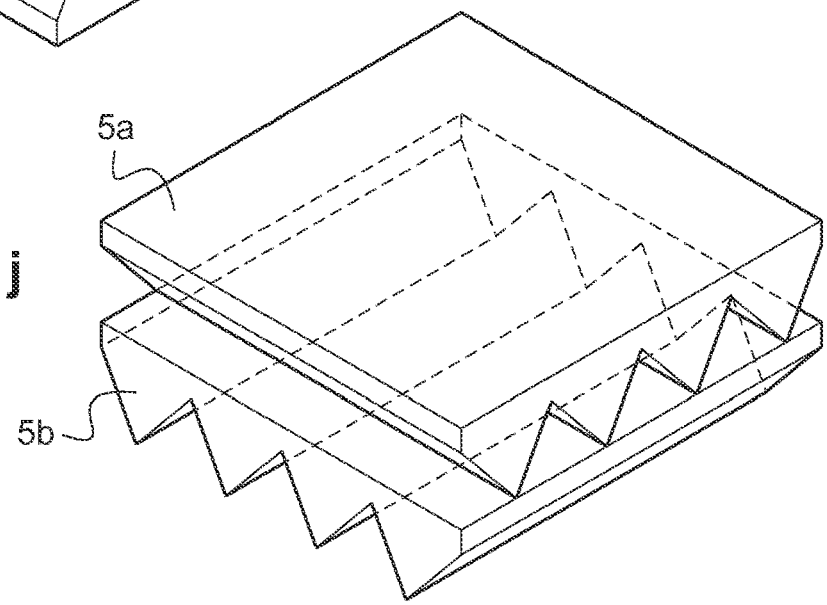
Figure 1K:
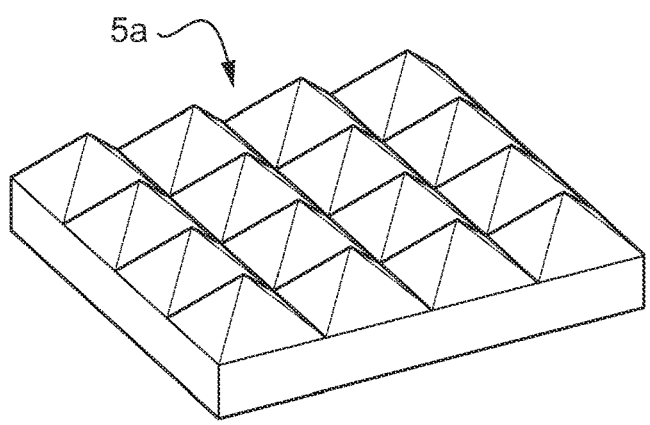
Figure 1L:
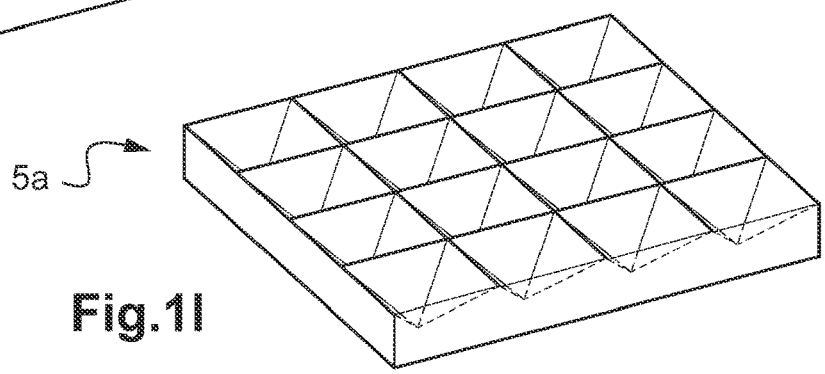

FIG. 1i is an overview of a collimation optic.
FIG. 1j is an overview of a collimation optic.
FIG. 1k is an overview of a collimation optic.
FIG. 1l is an overview of a collimation optic.
FIG. 1m is an overview of a collimation optic.
FIG. 1n is an overview of a collimation optic.
FIG. 1o is an overview of a collimation optic.
FIG. 1p is an overview of a collimation optic.
FIG. 1r is an overview of a collimation optic.
FIG. 1s is a front-on view of a redirection optic.

Figure 2A:
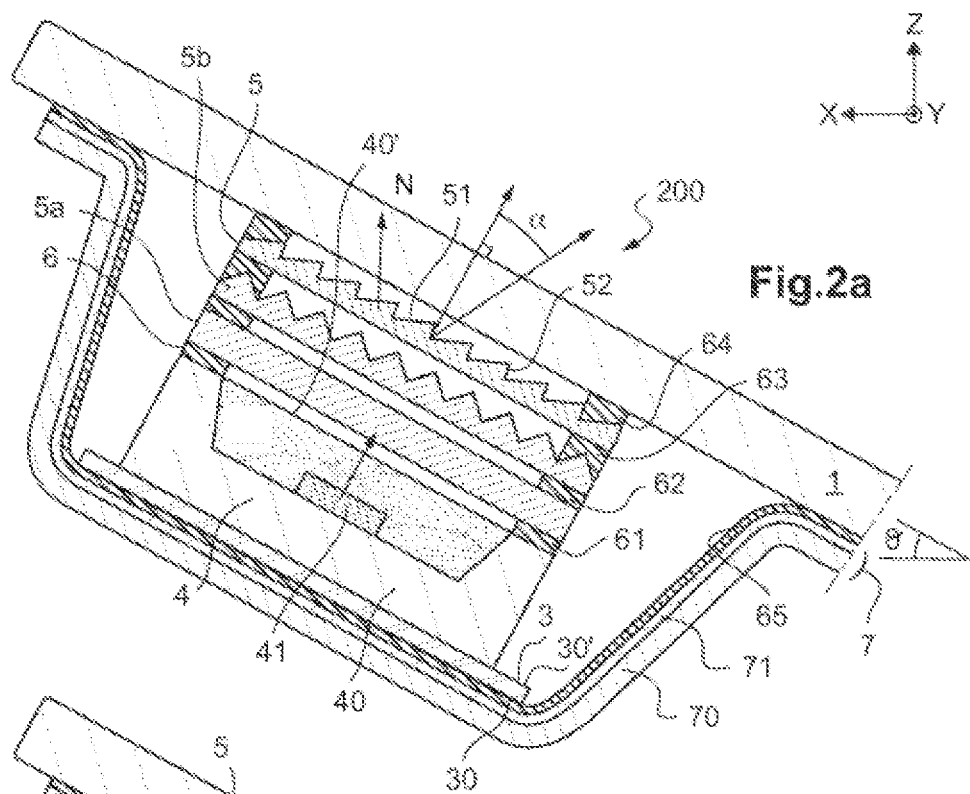

FIG. 2a is a cross-sectional view of a rear window (back window) according to a second embodiment.

Figure 2B:
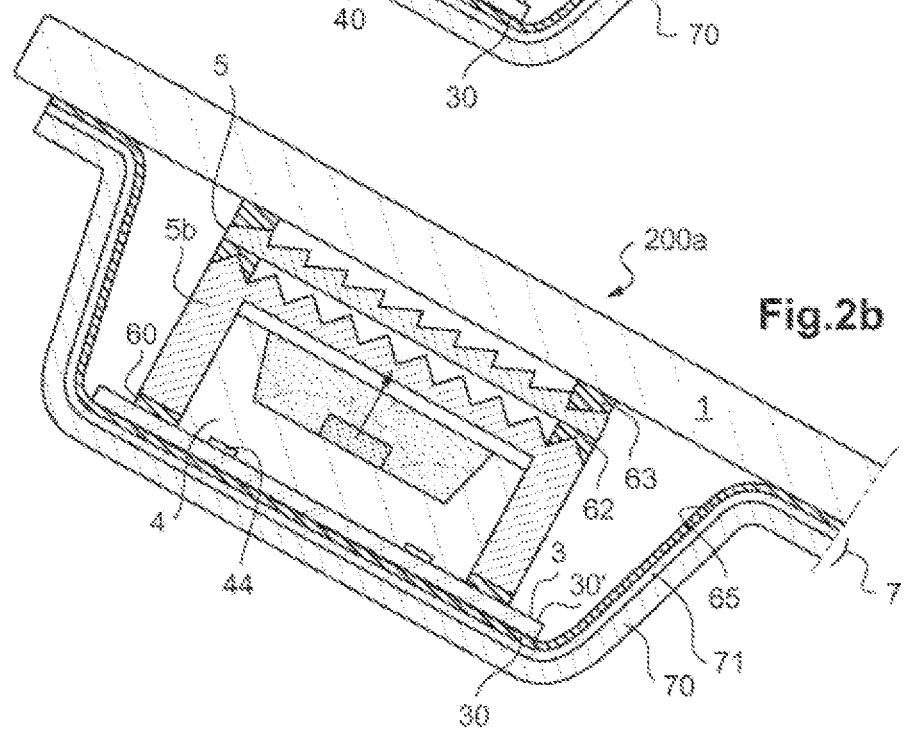

FIG. 2b is a cross-sectional view of a rear window (back window) according to an alternative of the second embodiment.

Figure 2C:
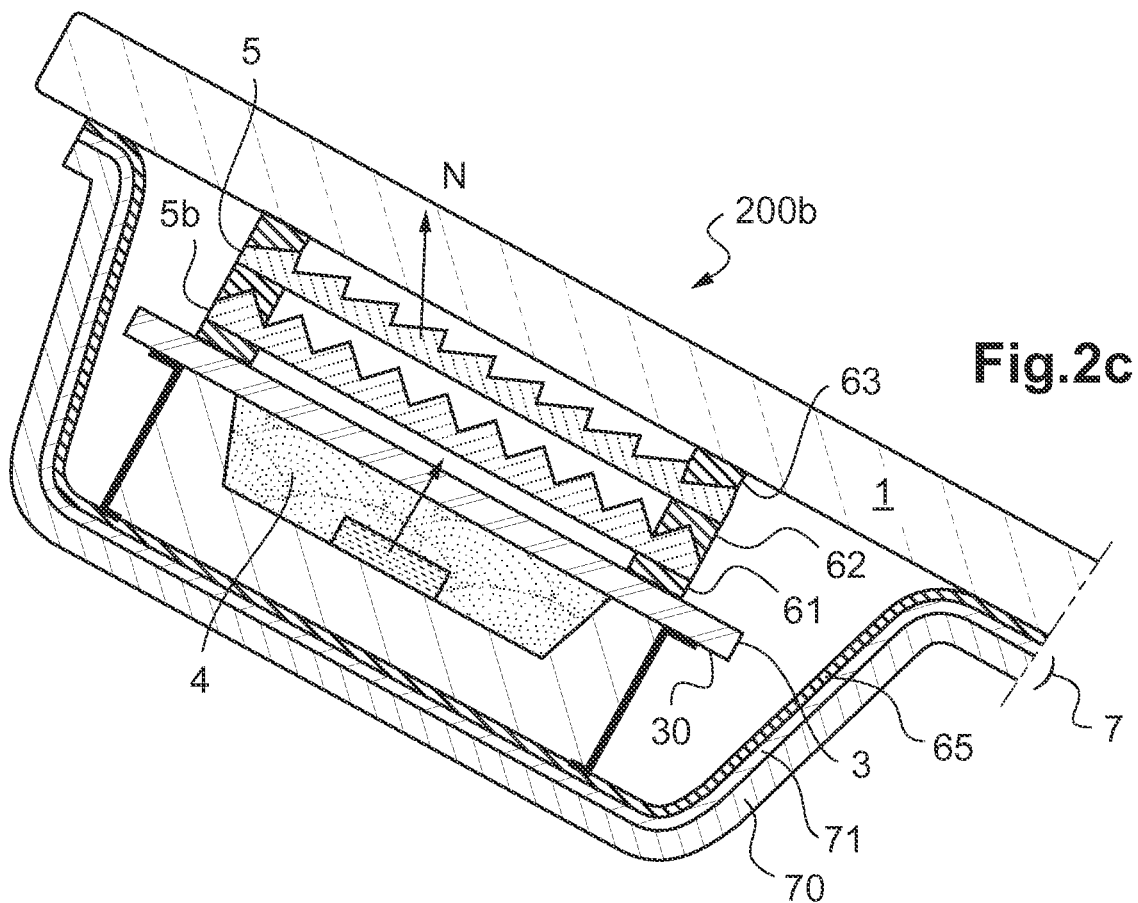
Figure 2D:
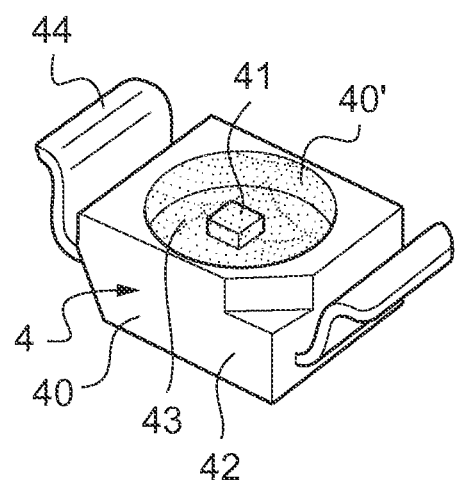

FIG. 2c is a cross-sectional view of a rear window (back window) according to another alternative of the second embodiment, with a reverse-mount diode. FIG. 2d shows this type of diode.

Figure 2E:
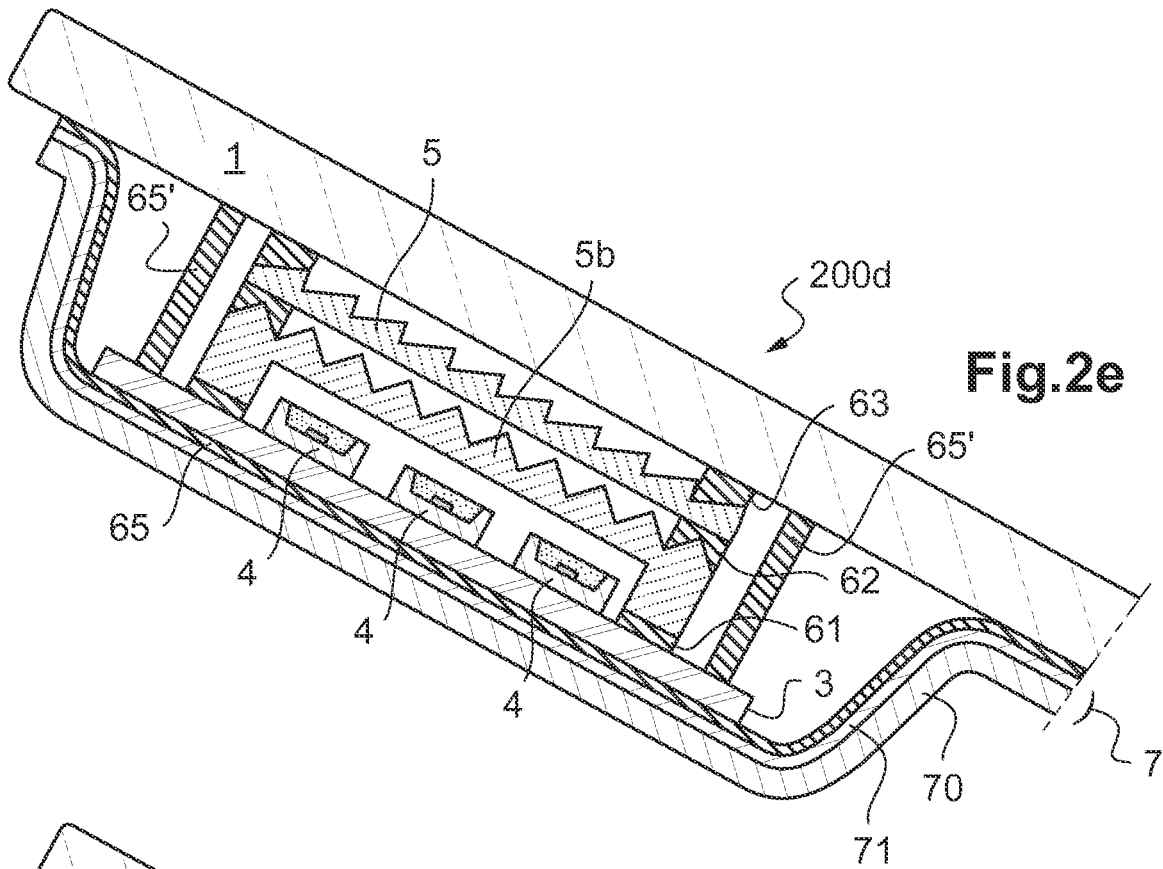

FIG. 2e is a cross-sectional view of a rear window (back window) according to an alternative of the second embodiment.

Figure 2F:
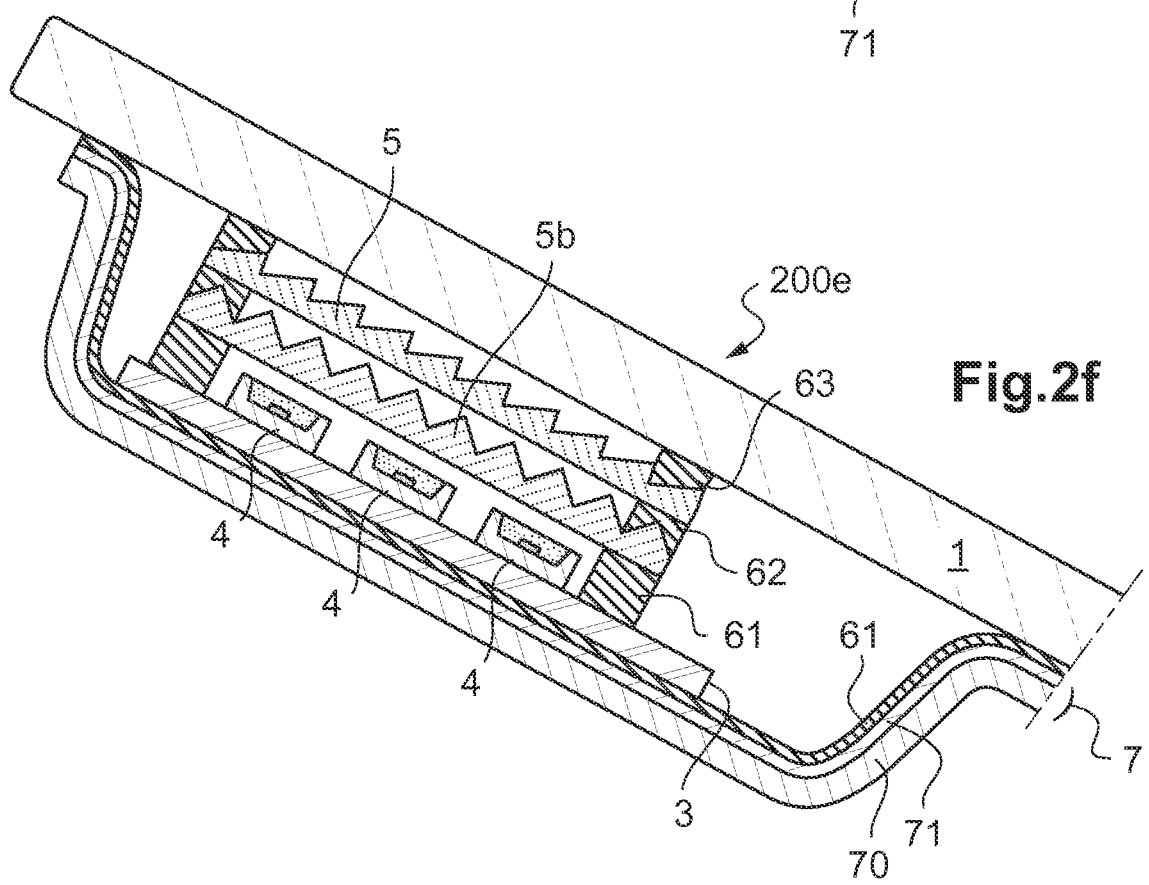

FIG. 2f is a cross-sectional view of a rear window according to another alternative of the second embodiment.

FIG. 3a is a front-on view of a deflector (fixed side window) with LEDs providing collimated and redirected light according to the invention. FIG. 3b is a cross-sectional view of the latter deflector.

FIG. 3c is a front-on detail view of LEDs equipped with their collimation optic and redirection optic, in particular to be viewed with reference to FIG. 3a.

FIG. 3d is an alternative front-on detail view of LEDs equipped with their collimation optic and redirection optic, in particular to be viewed with reference to FIG. 3a.

FIG. 4 is a cross-sectional view of a glazing providing collimated and redirected light according to the invention.

Figure 5:
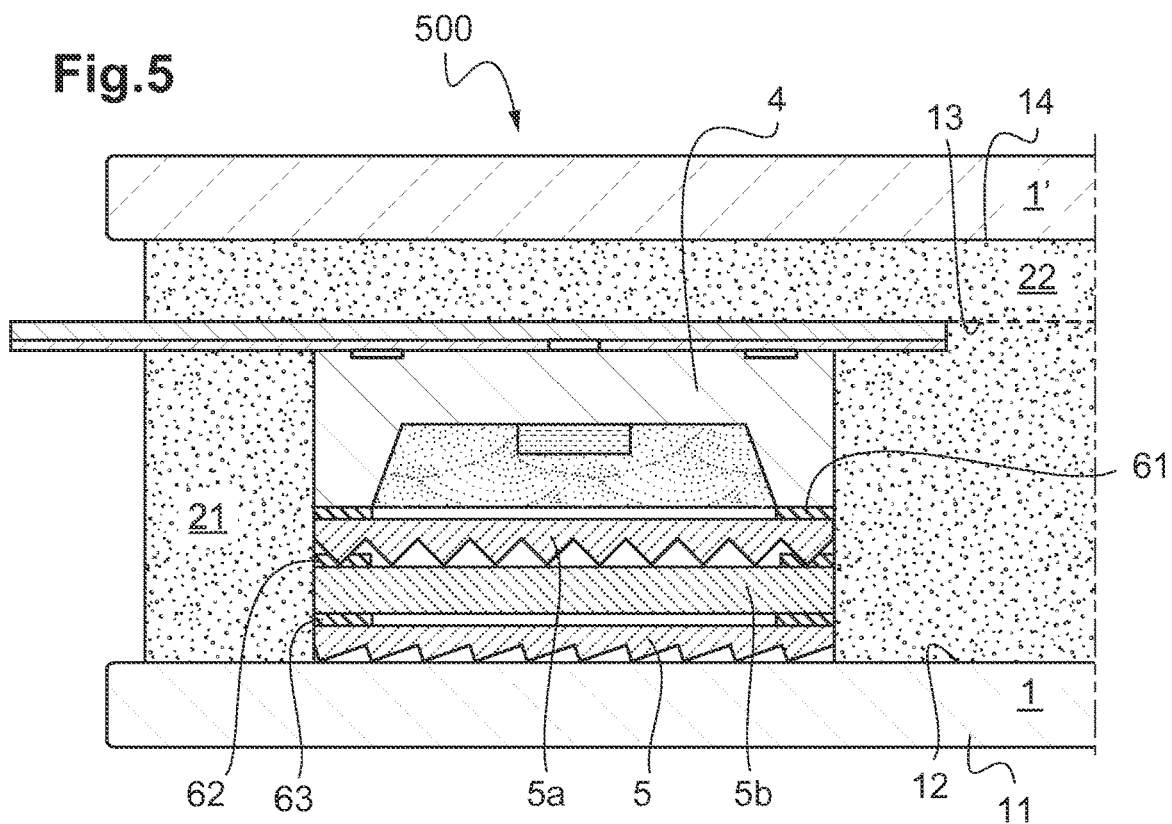

FIG. 5 is a cross-sectional view of a glazing with LEDs providing collimated and redirected light according to the invention.

Figure 6:
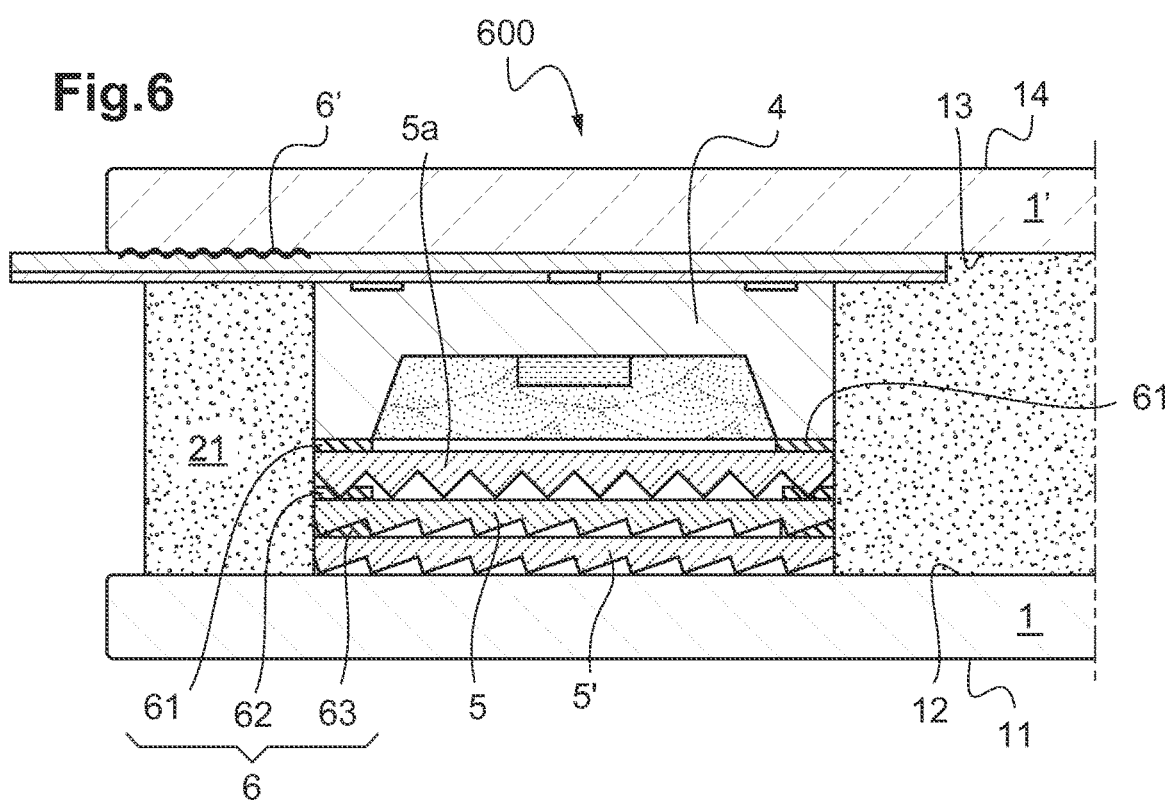

FIG. 6 is a cross-sectional view of a glazing (back window or deflector) with LEDs providing collimated and redirected light according to the invention.

FIG. 7 is a cross-sectional view of a glazing (back window or deflector) with LEDs providing collimated and redirected light according to the invention.

FIG. 8 is a cross-sectional view of a glazing (back window or deflector) with LEDs providing collimated and redirected light according to the invention.

FIG. 8' is an alternative of a cross-sectional view of a glazing (back window or deflector) with LEDs providing collimated and redirected light according to the invention.

FIG. 9 is a cross-sectional view of a glazing (back window or deflector) with LEDs providing collimated and redirected light according to the invention.

FIG. 10 is a cross-sectional view of a glazing (back window or deflector) with LEDs providing collimated and redirected light according to the invention.

FIG. 11 is a cross-sectional view of a glazing (back window or deflector) with LEDs providing collimated and redirected light according to the invention.

For the sake of simplicity the glazings have been shown flat but are in fact generally curved.

The figures are not to scale and are schematic. All of the figures describe a collimation optic and a redirection optic obeying at the laws of geometric optics. A holographic redirection optic may be substituted, the angle of deviation will depend on the pitch and on the wavelength of the light.

FIG. 1 is a front-on view of a back window 1000 with two series of LEDs providing redirected, collimated light according to the invention each on a diode carrier.

The inorganic light-emitting diodes 4 are surface mount devices (SMDs) mounted on a diode carrier, said diodes for example emitting MV red for rear lights or MV yellow for indicator lights, and therefore in the direction of the exterior face F1 11 of the back window 1.

The following are shown:
a first series of 6 LEDs 4 providing MV red light that is collimated and redirected by optics (collimation and redirection 4 toward the ground) along the upper edge and centered in a rectangular strip in order to form a third stoplight 101 (zone L3)
a second series of 6 LEDs 4 providing MV yellow light that is collimated and redirected by optics (collimation and redirection 4 toward the ground) along the lower edge in a rectangular strip in order to form an indicator side-repeater light 103 (zone L4)

The diode carrier is a printed circuit board (PCB board) of thickness of at most 0.2 mm and preferably of 0.1 mm to 0.2 mm. The diode carrier extends beyond the edge face of the back window, which is a laminated or single glazing. It for example includes a diode-bearing portion, and an electrical-connection portion 35 extending beyond the glazing and (partially) between one or more internal and/or external peripheral masking layers that are in particular made of black enamel (not shown).

The face called the front face of the diode carrier bears conductive tracks facing the face F2 and the back face is for example against face F3 if the back window is laminated. Each diode has an emitting face emitting in the direction of the exterior glazing 1, and each diode has an edge face.

The diodes 4 (with a single semiconductor chip here) are of square shape of width of about 5 mm or less.

FIG. 1a is a front-on detail view of the diode carrier 3 with on the front face the diodes 4 (with the chips 41 and the outline 40) each diode being equipped with its individual collimation optic made up of an array of prisms extending along the horizontal H and its redirection optic 5 made up of an array of asymmetric prisms extending along the horizontal H on the side of the exit surface 30'. Thin and transparent optical films that are for example each of square shape and in particular a stack of two or three or more films is preferred.

FIG. 1b is an alternative front-on detailed view with (collimation and redirection) optics 5 that are common to the diodes 4. Thus, the collimation optic and the redirection optic 5 extend far enough to cover all or some of the diodes (at least coverage per group of diodes). Between the diodes 4 the optics (non-functional portions 55') may be of small width or even of zero width and/or without texture (texture only facing the diodes 4). For each optic, one or more thin and transparent optical films, for example of rectangular shape (constant or small width between the diodes as mentioned above), and in particular a stack of two or three or more films, is preferred.

FIG. 1*i* is an overview of a collimation optic according to the invention. The collimation optic 5*a* is here a prismatic optical film that will for example be fastened on its periphery by a double-sided adhesive or a glue to the exit surface (generating an air-filled cavity entry-side) of the diode or even on a diode carrier (in particular prismatic film common to a plurality of diodes). It is for example a question of a plastic, in particular PET, film of less than 0.3 mm thickness that is partially textured in its thickness.

It includes in its front face an array of preferably contiguous and even symmetric prisms 50 with apexes S and with a pitch T between the apexes that is from 10 µm to 500 µm, extending longitudinally along an axis making an angle of at most 10° to the reference direction, here the horizontal for the back window (or as a variant a windshield), and even parallel to the reference direction.

Each prism is defined by two longitudinal faces. Each prism has an angle at the apex ranging from 60 to 110°, better still of 90° and each longitudinal face makes with the plane of the optical film 5*a* an angle ranging from 30 to 55° and better still of 45°.

For example, the pitch is 160 µm and the height 80 µm and the remaining thickness is 175 µm with angle at the apex and valley side of 90° (+−20 arc).

Air is between the exit surface and the entrance face of this single optical film 5*a* forming the collimation optic.

Air is between the prisms of the front face of this collimation optical film 5*a*; the apexes of the features of each front face make physical contact for example with a redirection optical film.

The adhesive bonding of this optical film 5*a* to the exit surface of the diode (or diodes or of the diode carrier) may be frame-like and form a seal.

Here the apexes and valleys are pointed (the features are contiguous).

As a variant, the apexes are rounded and the lateral faces curved; angles representative of the prisms (angle at the apex, angle to the plane of the film) are defined on the basis of two straight lines b1, b2 that are secant in A, passing through the inflection points I1, I2. The radius of curvature is also limited.

FIG. 1*j* is an overview of a collimation optic.
This figure differs from FIG. 1*i* in that to form the collimation optic an identical second prismatic film 5*b* that is crossed at 90° and for example adhesively bonded (welded, etc.) on its periphery to the first prismatic film 5*a* has been added.

FIG. 1*k* is an overview of a collimation optic.
FIG. 1*k* differs from FIG. 1*i* in that the collimation optic 5*a* (again a plastic film that is partially textured in its thickness, for example a film made of PET of less than 0.6 mm thickness) bears two-dimensional features.

Each two-dimensional feature being defined by a flank and in a plane P normal to the film 5*a* each two-dimensional feature has an angle at the apex ranging from 60 to 110°, each intersection of the flank with the plane P making with the plane of the film an angle ranging from 30 to 55°. Preferably, an angle at the apex (in the plane P) of 90° is chosen and the 2 other angles are chosen to be 45°.

The two-dimensional features are here raised, the apexes of the features of each front face are free or make physical contact with a transparent element (face F2 of the exterior glazing for example), and air is between the two-dimensional features.

FIG. 1*l* is an overview of a collimation optic according to the invention.

This figure differs from the preceding figure in that here the two-dimensional features of the film 5*a* are recessed, the array of two-dimensional features is an array of cavities, the apexes S are oriented (toward the interior of the passenger compartment (toward face F3 of a laminated glazing)) and the top surface of each cavity is free or makes physical contact with a transparent (redirection optical) element and air is in the cavities.

FIGS. 1*m* to 1o are overviews of a collimation optic.
This figure differs from FIG. 1*l* in that what is shown is not a film but a part with a textured 2D plate and a peripheral extension 55*a*.

The part 5, which forms a collimation optic of a diode 4, includes a smooth entrance face 5 (spaced apart from the exit surface 40) and a textured exit face, in particular a textured functional central zone, here an array of recessed pyramids. The part 5 includes a peripheral extension, preferably taking the form of a hollow body or surround for attaching to the diode carrier 3, for example with a glue, and/or to the diode, and/or forming a barrier to the PVB (by way of precaution) if the glazing is laminated. The part 5 for example has a square outline and in particular an outline similar to that of the diode. The part 5 is for example made of PMMA and obtained by molding. In the case of a laminated glazing, the walls 53 preferably make contact with the PVB. The part 5 is thus here housed entirely in the through-aperture of a potential PVB.

The part 5 preferably includes a portion housing the diode 4. The walls 53 of the surround include two or better still four internal stubs 55*a* for holding the diode via its edge face.

This part 5 may receive a redirection film.
FIGS. 1*p* to 1*r* show an overview of a collimation optic.

The part 5 forming the collimation optic of the diode 4 includes a textured face, here a Fresnel lens with a central zone, and a peripheral extension 55, preferably taking the form of a hollow body or surround for attaching to the diode carrier 3, for example with a glue, and/or to the diode, and/or forming a barrier to the PVB (by way of precaution) if the glazing is laminated.

The part 5 for example has a square outline. It is for example made of PMMA and obtained by molding.

The walls 55 preferably make contact with the potential PVB (cavity forming the through-aperture).

The part 5 is here housed entirely in the through-aperture 20*a*.

The part 5 here comprises a portion 55*b* housing (retaining) the diode 4. The walls 55 of the surround include two or better still four internal stubs 55*a* for holding the diode via its edge face. The collimation optic (the textured plate) is spaced apart from the exit surface 40'.

The functional zone, and therefore a central zone, of the textured exit face is located facing the exit surface. The peripheral zone may or may not be textured or even serve to create an air-filled cavity.

The Fresnel lens is able to cover the diode 4 like a hat.
This part bearing the collimation optic has fastening stubs 55*a* for holding the diode 40, 41.

Once the light has been collimated (with one or more films, a plate or molded part) it is necessary to redirect it toward the ground for the back window or as a variant for the windshield (or for a rear window, etc.).

FIG. 1*s* is a front-on view of a redirection optic that will be on the front face of the collimation optic (fastened to its periphery, for example by adhesive bonding or welding or spaced apart therefrom by most 1 mm). It is a redirection optical film including an array of asymmetric prisms with apexes and with a pitch T' between apexes that is from 10 μm to 500 μm, with preferably at least 4 or even 10 features facing the exit (or light-emitting) surface, The redirection optic thus includes a first optical film 5 that is asymmetric prismatic with, on a main face opposite to the exit surface, called the final front face, said array of asymmetric prisms extending longitudinally along a third axis making an angle of at most 10°, at most 5° or at most 2° to said first axis and even parallel and/or to the reference direction of the glazing (the horizontal for the back window) and even is parallel, in particular with a submillimeter-sized thickness.

Each asymmetric prism is defined by first and second longitudinal faces the prism preferably having a length L and a width W with L>2 W and better still L>5 W or L>10 W. Each asymmetric prism has an angle at the apex a'0 ranging from 50 to 60° better still of 55°±5° or 55°±2° and the first longitudinal face 51 (called the long side) makes with the plane of the film a first angle, ranging from 31 to 41° better still of 35°±5° or 35°±2° (naturally the second longitudinal face (called the short side)) 52 makes with the plane of the film a second angle, ranging from 79 to 99° better still from 85 to 90° or 88 to 90°, and preferably of at most 90°. Preferably, the difference a4-a3 is larger than 40° and even than 50°.

The film is preferably a plastic film that is partially textured in its thickness, for example a film made of PET and of less than 0.6 mm or 0.3 mm thickness.

As a variant, an assembly consisting of two parallel optical films that are asymmetric prismatic is chosen.

FIG. 2a is a cross-sectional view of a rear window 200 (back window) according to a second embodiment.

This back window 200 comprises a transparent first glazing 1 made of organic or mineral glass, with main faces 11, 12 called faces F1 and F2, and an edge face 10, and a so-called reference direction that is the horizontal in the plane of the (optionally curved) glazing Each diode (on a diode carrier 3) emits in the MV red toward the face F2 with a half emission angle at the apex of 50° to 70° and a main emission direction normal to the plane of the diode. As a variant it has a primary optical.

To the exit surface is fastened by a peripheral adhesive bonding 61 a first optical film 5a with said array of prisms extending longitudinally along a first axis.

To the front face of this first film 5a is fastened by a peripheral adhesive bonding 62 (glue, double-sided adhesive, etc.) a second optical film 5b with the second array of prisms extending longitudinally along a second axis making an angle to said first axis of 90°; the first or second axis makes with the reference direction a zero angle.

To the front face of this second film 5b is fastened by peripheral adhesive bonding 63 (glue, double-sided adhesive, etc.), a first redirection optical film 5 with array of asymmetric prisms with a long side 51 and a short sides 52 extending longitudinally in the reference direction.

The normal N to the long side is directed toward the face F2 and oriented toward the top of the rear window or of the windshield (for a redirection toward the ground).

The front face of this redirection film 5 is fastened by peripheral adhesive bonding 64 (glue, double-sided adhesive, etc.) to face F2; this is optional because here a protective rear film 7 (here a bilayer 70, 71 covers and extends beyond the assembly consisting of the carrier 3, the LED 4 and the optical films 5a, 5b, 5) is fastened with adhesive 65 to face F2 of the single glazing (or F4 of a laminated glazing) and bears the diode carrier 3. For example, this film 7, 70 is tinted (in its bulk) or bears an electrically conductive functional layer 71 (solar control, etc.) on one of its main faces.

The back window 200 is for example oriented between 12° and 80° from the ground and for example from 50 to 70°. The redirection film 5 for example redirects the light by an angle of at least 15° toward the ground.

FIG. 2b is a cross-sectional view of a rear window (back window) 200a according to an alternative of the second embodiment.

It differs from the preceding figure, FIG. 2a, in that the collimation optic 5b is a molded part with an array of prisms 5b (with an array of crossed prisms thereabove) or an array of two-dimensional features. This part is fastened to the diode carrier 3 by adhesive bonding 60 (glue, double-sided adhesive). It may be a question of the part described in FIGS. 1m to 1r.

FIG. 2c is a cross-sectional view of a rear window 200b according to another alternative of the second embodiment. It differs from FIG. 2a above all in that the diode 4 is reverse mounted and the collimation optical film 5b includes two-dimensional features (or two crossed prismatic films are employed). The diode carrier 3 may be apertured. FIG. 2d shows this type of diode. The collimation optical film 5b is adhesively bonded on its periphery by any means 61 to the diode carrier 3

FIG. 2e is a cross-sectional view of a rear window (back window) 200d according to another alternative of the second embodiment.

It differs from FIG. 2a in that the collimation optic 5b is a molded part that is common to a plurality of diodes 4, with two-dimensional features, the redirection film 5, which is adhesively bonded on its periphery to the part 5b by any means 62, also being common to these diodes. The diode carrier may be adhesively bonded by any means 65' (glue, double-sided adhesive, etc.) to the face F2 of the single glazing 1 (or as a variant F4 of a laminate).

FIG. 2f is a cross-sectional view of a rear window 200e according to another alternative of the second embodiment. It differs from FIG. 2d in that the collimation optic 5b is a prismatic film or a film comprising two-dimensional features that is common to a plurality of (conventionally mounted) diodes just like the redirection film 5 that surmounts it.

FIG. 3a is a front-on view of a deflector (fixed side window) 300 with LEDs 4 providing collimated and redirected light according to one embodiment of the invention. FIG. 3b is a cross-sectional view of the deflector 300 of the latter embodiment.

This deflector 300 comprises a transparent first glazing 1 made of organic or mineral glass, with main faces 11, 12 called faces F1 and F2, and an edge face 10, and a so-called reference direction that is the normal to the horizontal in the plane of the (optionally curved) glazing. It is for example of quadrilateral shape with an upper edge of smaller width. It includes a masking layer 15 (black enamel, etc.) for example on face F2 and equipped with an aperture 15a.

The series of diodes 3 is located facing the aperture 15a and interior-side and emits MV yellow toward the (interior) face F2.

For example, it is a question of a luminous strip that is rectangular (or any other shape) on the lower border.

To the exit surface is fastened by a peripheral adhesive bonding 60 a first optical film 5a with said array of prisms extending longitudinally along a first axis (see FIG. 3b). To the front face of this first film is fastened by a peripheral adhesive bonding 61 a second optical film 5b with the second array of prisms extending longitudinally along a second axis making an angle to said first axis of 90°; the first or second axis makes with the reference direction a zero angle.

To the front face of this second film is fastened by peripheral adhesive bonding 62, a first redirection optical film 5 with array of asymmetric prisms with a long side 51 and a short sides 52 extending longitudinally in the reference direction. The normal N to the long side is directed toward the face F2 and oriented toward the front of the deflector (for a redirection toward the rear).

The front face of this redirection film is fastened by peripheral adhesive bonding 64 to face F2; this is optional because here a protective rear film 7 with adhesive 65 is present (here a bilayer 70, 71 covers and extends beyond the assembly consisting of the carrier, the LED and the optical films 5a, 5b, 5). For example, it is tinted or bears an electrically conductive functional (solar-control, etc.) layer 71.

The back window is for example oriented between 12° and 80° from the ground and for example from 50 to 70°.

The film for example redirects the light by an angle of at least 15° toward the ground. As a variant, it is a question of a laminated glazing with adhesive bonding to face F4. The enamel may be on face F2 or F3 or F4 (each with an aperture).

In relation to the embodiment of FIG. 3a, FIG. 3c is a front-on detail view of the diodes 4 (with the chips 41 and their outline 40) each diode being equipped with its individual collimation optic made up of an array of prisms extending along the normal to the horizontal H and its redirection optic 5 made up of an array of asymmetric prisms extending along the normal to the horizontal H on the side of the exit surface 30'.

Thin and transparent optical films that are for example each of square shape and in particular a stack of two or three or more films is preferred.

In relation to the embodiment of FIG. 3a, FIG. 3d is an alternative front-on detailed view with (collimation and redirection) optics that are common to the diodes. Thus, the collimation optic and the redirection optic 5 extend far enough to cover all or some of the diodes (at least coverage per group of diodes). Between the diodes 4 the optics (non-functional portions 55') may be of small width or even of zero width and/or without texture (texture only facing the diodes 4). For each optic, one or more thin and transparent optical films, for example of rectangular shape (constant or small width between the diodes as mentioned above), and in particular a stack of two or three or more films, is preferred.

FIG. 4 is a cross-sectional view of a glazing 400 providing collimated and redirected light according to the invention. This laminated vehicle and in particular motor-vehicle back window 400 comprises:
- a transparent first glazing 1, made of mineral or even organic glass, forming the exterior glazing, with main faces 11, 12 called faces F1 and F2, an edge face 10, and a so-called reference direction that is the horizontal between the lateral edges of the back window
  - a second glazing 1', forming the interior glazing, for example made of TSA (or clear or extra-clear) glass and in particular of 2.1 mm thickness or even 1.6 mm thickness or even of less than 1.1 mm thickness (in particular chemically toughened glass), with third and fourth main faces 13, 14 called face F3 and face F4, respectively;
  - between face F2 and face F3, which form the internal faces 12, 13 of the laminated glazing, a lamination interlayer 2, 21, 22 made of polymeric material, here made of PVB, of thickness that is at most 2 mm or submillimeter-sized and preferably about 1 mm or less, for example of about 0.76 mm for a conventional PVB (RC41 from Solutia or Eastman) or, as a variant, if necessary, a (three-layer or four-layer) acoustic PVB for example of about 0.81 mm thickness, including a layer of PVB 21 with a face FB making adhesive contact with the (bare or coated) face F2 and an aperture 2e that emerges onto the face F2; the edge face 20 of this PVB being set back, for example by 2 mm, from the edge face of the glazings,
  - an optional for example low-emissivity (ITO, etc.) functional layer on face F4 and/or alternatively face F3, which is optionally coated with a (heating, low-emissivity, etc.) functional layer
  preferably internal and external peripheral masking layers on face F1 or 11 or on F3 or 13 or preferably on face F2 and even on F4 or 14, for example made of black enamel.

In the emergent aperture of the PVB 2 is housed a light-emitting element that is an LED 4 on a carrier 3, and which is able to emit MV red light in order to form a stoplight or another signaling light (or MV yellow for an indicator side-repeater light inter alia) or to serve for an external symbolism (pictogram, etc.) emitted toward face F2 12, said LED having an exit surface 30 toward face F2 and an opposite entrance surface 30 at the bottom of the aperture. The carrier 3 includes a connector 35 that extends beyond the edge face of the first glazing, which is here fastened entrance-surface side on its periphery.

Facing the LED 4 is placed in this order:
- a collimation optic 5a, having a rear face 40 on the side of the exit surface of the diode and a front face 40' opposite to the rear face
- a redirection optic 5, having a rear face on the side of the exit surface of the diode and a front face opposite to the rear face As a variant, facing the LED is placed a holographic redirection optic having a rear face exit-surface side and a front face opposite to the rear face.

The emergent aperture 2 encircles the LED 4 and the optics 5a, 5 and even makes contact with its edge face or as a variant is spaced apart by at most 0.5 mm and even at most 0.1 mm from this edge face.

The following are for example chosen during manufacture: a first and only sheet 21, made of PVB, with one through—(or as a variant blind) aperture and, as a variant, also a rear second sheet of PVB on the rear-face side. By reflow, the two sheets are optionally joined with an interface possibly being visible.

The collimation optic 5a is here a prismatic optical film or preferably a film comprising two-dimensional features that is fastened on its periphery by a double-sided adhesive or a glue 61 to the exit surface of the diode (generating an air-filled cavity entry-side). It is for example a question of a plastic film of less than 0.3 mm thickness and made of PET that is partially textured in its thickness. For example, the pitch is 160 μm and the height 80 μm and the remaining thickness is 175 μm with angle at the apex and valley side of 90° (+−20 arc). Air is between the exit surface and the entrance face of this single first optical film of the collimation optic. Air is between the features of the front face of the collimation optic; the apexes of the features make physical contact with the redirection optic 5.

The redirection optic 5 is here an asymmetric prismatic optical film against or preferably as here fastened on its periphery by a double-sided adhesive or a glue 60 to the front face of the optic 4 (generating an air-filled cavity entry-side) and preferably against or as here fastened on its periphery by a double-sided adhesive or a glue 60 to the face F (generating an air-filled cavity entry-side). Air is between the prisms of the front face of the redirection optic; the apexes of the features make physical contact with face F2. The stack of these two films 5a, 5 may be very thin.

FIG. 5 is a cross-sectional view of a glazing 500 with LEDs providing collimated and redirected light according to the invention.

This figure differs from FIG. 4 in that there has been added, in the through-aperture of the PVB 2, with respect to the redirection optic, which would include just the first prismatic film 5a, a second prismatic optical film 5b that is crossed with the first film and with peripheral adhesive bonding 62; and indeed a rear PVB 22.

The following are for example chosen during manufacture: a first sheet 21, made of PVB, with one through—(or as a variant blind) aperture with a face FB making adhesive contact with the face F2 12 (outside of the diode zone) and a second rear PVB sheet on the side of the rear face 22 with a face FA making adhesive contact with the face F3 13. By reflow, the two sheets are optionally joined with an interface (here shown by the dotted line) possibly being visible.

If necessary, the carrier 3 is fastened beforehand to the rear sheet 22 by adhesive bonding or by creating point adhesive contact by applying spot heating (and pressure). Point adhesive contact may be created between the two sheets 21, 22 outside of the LED zone or carrier zone 3 before or after installation between the two glazings 1, 1'. The stack of these three films 5a, 5b, 5 may be very thin.

FIG. 6 is a cross-sectional view of a glazing 600 (back window or deflector) with LEDs providing collimated and redirected light according to the invention.

This figure differs from FIG. 4 in that a second redirection optical film 5' has been added (in the through-aperture of the PVB 2) to the first redirection film 5 and adhesively bonded on its periphery 63.

FIG. 7 is a cross-sectional view of a glazing 700 (back window or deflector) with LEDs providing collimated and redirected light according to the invention.

This figure differs from FIG. 4 in that a rear PVB 22 is optionally added and the collimation optic (in the aperture of the PVB) is a molded part (with prismatic features 5a) for example made of PMMA with an extension 55 adhesively bonded to the diode carrier 3. A crossed prismatic film 5b that is on the molded part and under the redirection film 5 is used.

As a variant, facing the LED is placed a molded part with a holographic redirection optic having a rear face exit-surface side and a front face opposite to the rear face.

FIG. 8 is a cross-sectional view of a glazing 800 (back window or deflector) with LEDs providing collimated and redirected light according to the invention.

This figure differs from FIG. 7 in that the aperture in the PVB is internal (blind). For example, during manufacture a front PVB sheet 23 is put in place and the rear PVB sheet has even been removed (diode carrier adhesively bonded to face F3).

To prevent reflow during the lamination from suppressing the optical function of the redirection optic 5, a local plastic protective film 7, for example of less than 0.3 mm thickness and made of PET, is adhesively bonded on its periphery to the front face of the redirection prismatic optical film 5. This film 7 may be a color filter.

The redirection optic 5 is here an asymmetric prismatic optical film against or as here fastened on its periphery by a double-sided adhesive or a glue 60 to the plastic protective film 7.

As a variant, facing the LED is placed a molded part with a holographic redirection optic having a rear face exit-surface side and a front face opposite to the rear face, and the protective film is preserved.

FIG. 8' is an alternative of a cross-sectional view of a glazing 800' (back window or deflector) with LEDs providing collimated and redirected light according to the invention.

This figure differs from the preceding figure in that the rear PVB sheet 22 is preserved and the plastic protective film 7 is a covering film for example of less than 0.3 mm thickness and made of PET that is adhesively bonded on its periphery to the front face of the redirection prismatic optical film 5 and/or that simply covers (closes) the emergent aperture. It makes adhesive contact with the front PVB sheet 23 and is for example preassembled therewith (functional PET/front PVB together before lamination).

This film 7, 71 may be tinted and/or have an electrically conductive functional coating 72 face-F2 or face-F3 side: solar control coating, low-E coating, etc.

FIG. 9 is a cross-sectional view of a glazing 100' (back window or deflector) with LEDs providing collimated and redirected light according to the invention.

This figure differs from FIG. 4 in that the redirection optic 5 is larger than the emergent aperture (the collimation optical film 59 remains housed therein). The redirection optic 5 is against or as here fastened on its periphery by a double-sided adhesive or a glue 63 to face F2. A rear PVB sheet 22 has also been added.

FIG. 10 is a cross-sectional view of a glazing 110 (back window or deflector) with LEDs providing collimated and redirected light according to the invention.

This figure differs from the preceding figure in that the diode 4 is reverse mounted, and the diode carrier 3 is closer to face F2 and is apertured and receives the optics 5a, 5. As a variant, facing the LED is placed a holographic redirection optic having a rear face exit-surface side and a front face opposite to the rear face, and the diode carrier 3 is closer to face F2 and is apertured and receives this optic.

FIG. 11 is a cross-sectional view of a glazing 120 (back window or deflector) with LEDs providing collimated and redirected light according to the invention.

This figure differs from the preceding figure in that the diode carrier 3 is unapertured and forms the redirection optic 5 and the collimation optic is adhesively bonded beforehand to the exit surface face-F2 side.

The invention claimed is:

1. An external luminous signaling vehicle glazing chosen from a side window or a rear window or a front windshield, comprising:
   a first transparent glazing, made of mineral or organic glass, with first and second main faces and an edge face;
   a light source on a side of the second main face and able to emit external signaling light, said light source having an exit surface oriented toward the second main face,
   wherein the light source is a set of inorganic light-emitting diodes, each diode including at least one semiconductor chip, each diode being able to emit in the direction of the second main face,
   wherein, each diode has a main emission direction normal to a plane of an emitting face of the diode, the glazing further including a set of collimation optics, each collimation optic being associated with a light-emitting diode, each collimation optic including a front face oriented toward the second main face and an opposite rear face, wherein each collimation optic is made of transparent material and includes an array of separate features with apexes S and with a pitch T between apexes that is from 10 µm to 500 µm, wherein the collimation optic includes:

a) an optical element having a surface that includes said array of separate features said array of separate features being an array of two-dimensional separate features that form a repetitive pattern of said separate features along two different directions, b) or a set of at least a first and a second optical element that form said array of separate features:

the first optical element including on a first main face a first-array of separate features that are prisms extending longitudinally along a first axis, and, facing the first optical element, the second optical element including on a second main face a second array of separate features that are prisms extending longitudinally along a second axis making an angle to said first axis of 90±10°, and wherein the external luminous signaling vehicle glazing comprises a redirection optic, between the collimation optic and the second main face, which includes an asymmetric optical film or a set of asymmetric optical films, each including an array of asymmetric prisms with apexes and with a pitch T' between apexes that is from 10 µm to 500 µm, and wherein air is present between the exit surface of the light source and the rear face of the collimation optic, the two-dimensional separate features that form the repetitive pattern of said separate features along the two different directions are recessed to form an array of cavities in which air is present in the cavities, or the two-dimensional separate features that form the repetitive pattern of said separate features along the two different directions are raised, and air is between the asymmetric prisms.

2. The external luminous signaling vehicle glazing as claimed in claim 1, wherein:

for the rear window, the light source emits in the red, or, for the rear window or windshield, the light source emits in the yellow, and/or for the rear window or the windshield, the light source forms a symbolism.

3. The external luminous signaling vehicle glazing as claimed in claim 1, wherein, for the side window, the light source emits in the yellow, the assembly consisting of the light source and the collimation optic and the asymmetric redirection optic forming a side repeater.

4. The external luminous signaling vehicle glazing as claimed in claim 1, wherein the asymmetric prisms or the two-dimensional separate features are contiguous or essentially contiguous.

5. The external luminous signaling vehicle glazing as claimed in claim 1, wherein each asymmetric optical film is a plastic film that is partially textured in its thickness.

6. The external luminous signaling vehicle glazing as claimed in claim 1, comprising a flexible diode carrier of submillimeter-sized thickness.

7. The external luminous signaling vehicle glazing as claimed in claim 1, wherein the diodes are reverse-mount diodes.

8. The external luminous signaling vehicle glazing as claimed in claim 1, comprising a part that is mounted on a diode carrier and/or mounted on the diode or on a group of diodes, said part including:

the collimation optic, a peripheral extension extending in the opposite direction to the second main face along the edge face of the diode.

9. The external luminous signaling vehicle glazing as claimed in claim 8, wherein the peripheral extension is a surround of the diode or of the group of diodes.

10. The external luminous signaling vehicle glazing as claimed in claim 8, wherein the surround has a housing for accommodating the diode or a group of diodes, a wall of the surround includes stubs for holding the diode or the group of diodes.

11. The external luminous signaling vehicle glazing as claimed in claim 8, wherein the redirection optic includes a film against or fastened to a periphery of a front face of a functional portion of the collimation optic.

12. The external luminous signaling vehicle glazing as claimed in claim 1, wherein the collimation optic includes an optical film fastened to the diode on a periphery of the exit surface, and the redirection optic includes a film against or fastened to a periphery of a final front face of the asymmetric optical film.

13. The external luminous signaling vehicle glazing as claimed in claim 1, comprising a laminated glazing including:

said first transparent glazing, a second transparent glazing made of mineral or organic glass, with third and fourth main faces, between the second and third main faces, which are internal faces of the laminated glazing, a transparent lamination interlayer that is optionally tinted and/or optionally composite in its thickness, made of polymeric material, said lamination interlayer film having a main face oriented toward the third main face side and making adhesive contact with the third main face and another main face oriented toward the second main face side and making adhesive contact with the second main face.

14. The external luminous signaling vehicle glazing as claimed in claim 1, wherein the glazing is laminated and each diode is housed in an aperture of a lamination interlayer.

15. The external luminous signaling vehicle glazing as claimed in claim 1, wherein the diodes with their collimation and redirection optics are in through- or blind apertures in a polyvinyl butyral (PVB) film or in through- or blind apertures of a PVB film/functional film with an optional functional coating/PVB film.

16. The external luminous signaling vehicle glazing as claimed in claim 1, comprising a laminated glazing including:

said first transparent glazing, a second transparent glazing made of mineral or organic glass, with third and fourth main faces, between the third and fourth main faces, which are internal faces of the laminated glazing, a transparent lamination interlayer that is optionally tinted and/or optionally composite in its thickness, made of polymeric material, said lamination interlayer film having a main face oriented toward the third main face side and making adhesive contact with the third main face and another main face oriented toward the second main face side and making adhesive contact with the second main face, and wherein the collimation optic is larger than the diode and is fastened with said lamination interlayer and optionally the redirection optic is larger than the diode and is fastened to the collimation optic, or the collimation optic is fastened to the exit surface and the redirection optic is larger than the diode and is fastened to said lamination interlayer.

17. The external luminous signaling vehicle glazing as claimed in claim 16, wherein the collimation optic is between the second main face and the third main face.

18. The external luminous signaling vehicle glazing as claimed in claim 13, wherein the lamination interlayer is composite and includes the following stack outside of a diode zone: polyvinyl butyral (PVB) film/functional plastic film with an optional electrically conductive functional coating/PVB film, the functional plastic film extending over the second main face, and wherein the diode is between the second main face and the third main face.

19. The external luminous signaling vehicle glazing as claimed in claim 1, wherein the second main face is uncovered, the glazing is monolithic, the redirection optic is on the second main face.

20. A vehicle including at least one external luminous signaling vehicle glazing as claimed in claim 1.

21. A process for manufacturing an external luminous signaling vehicle glazing as claimed in claim 1, comprising, before installation on the first glazing:

pre-mounting on each diode the collimation optic and/or the redirection optic, or pre-mounting on each diode the collimation optic including a textured plate and with an extension onto a diode carrier.

22. A process for manufacturing a luminous signaling vehicle laminated glazing as claimed in claim 1, comprising:

positioning a diode carrier with the diodes on a lamination-interlayer sheet that is unapertured or with through- or blind apertures housing the diodes, and simultaneously or separately positioning the optional collimation optic and the redirection optic facing each diode, and successively:

installation of the assembly positioned between the first glazing and a second glazing, lamination under vacuum and with heating and optionally under pressure.

23. The process for manufacturing a laminated glazing as claimed in claim 22, wherein each collimation optic part or each redirection optic part is mounted on the diode carrier.

24. The process for manufacturing a laminated glazing as claimed in claim 22, wherein each diode is positioned on said lamination-interlayer sheet, with collimation optic housed in an aperture.

25. The process for manufacturing an external luminous signaling vehicle laminated glazing as claimed in claim 22, comprising, before said positioning, fastening a local protective film to a front face of the redirection optic.

26. The process for manufacturing an external luminous signaling vehicle laminated glazing as claimed in claim 22, further comprising creating point adhesive contact by heating and pressure.

* * * * *